United States Patent
Iwane et al.

(10) Patent No.: US 11,619,915 B2
(45) Date of Patent: *Apr. 4, 2023

(54) REINFORCEMENT LEARNING METHOD AND REINFORCEMENT LEARNING SYSTEM

(71) Applicant: FUJITSU LIMITED, Kawasaki (JP)

(72) Inventors: Hidenao Iwane, Kawasaki (JP); Junichi Shigezumi, Kawasaki (JP); Yoshihiro Okawa, Yokohama (JP); Tomotake Sasaki, Kawasaki (JP); Hitoshi Yanami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 282 days.

This patent is subject to a terminal disclaimer.

(21) Appl. No.: 16/797,573

(22) Filed: Feb. 21, 2020

(65) Prior Publication Data

US 2020/0285204 A1    Sep. 10, 2020

(30) Foreign Application Priority Data

Mar. 4, 2019  (JP) .............................. JP2019-039031

(51) Int. Cl.
  G05B 13/02    (2006.01)
  G06N 20/00    (2019.01)
  (Continued)

(52) U.S. Cl.
  CPC .......... G05B 13/0265 (2013.01); B25J 9/163 (2013.01); G06N 20/00 (2019.01); H02J 3/381 (2013.01); H02J 2300/28 (2020.01)

(58) Field of Classification Search
  CPC ............................. G06N 20/00; H02J 2300/28
  (Continued)

(56) References Cited

U.S. PATENT DOCUMENTS 8,429,097 B1 * 4/2013 Sivasubramanian ... H04L 67/16
    706/12
10,581,974 B2 * 3/2020 Sustaeta ............... G05B 13/024
    (Continued)

FOREIGN PATENT DOCUMENTS

JP    2007-065929 A    3/2007
JP    2008-111077 A    5/2008
    (Continued)

OTHER PUBLICATIONS

Doya, K., "Reinforcement Learning In Continuous Time and Space," Neural Computation, vol. 12, No. 1, Jan. 2000, pp. 1-29.
(Continued)

*Primary Examiner* — Md Azad
(74) *Attorney, Agent, or Firm* — Xsensus LLP

(57) ABSTRACT

A computer-implemented reinforcement learning method includes determining, based on a target probability of satisfaction of a constraint condition related to a state of a control object and a specific time within which a controller causes the state of the control object not satisfying the constraint condition to be the state of the control object satisfying the constraint condition, a parameter of a reinforcement learner that causes, in a specific probability, the state of the control object to satisfy the constraint condition at a first timing following a second timing at which the state of control object satisfies the constraint condition; and determining a control input to the control object by either the reinforcement learner or the controller, based on whether the state of the control object satisfies the constraint condition at a specific timing.

9 Claims, 17 Drawing Sheets

(51) Int. Cl.
  *B25J 9/16* (2006.01)
  *H02J 3/38* (2006.01)
(58) Field of Classification Search
  USPC .......................................................... 700/287
  See application file for complete search history.

(56) References Cited

U.S. PATENT DOCUMENTS

| | | | |
|---|---|---|---|
| 2004/0181334 | A1 | 9/2004 | Blumbergs et al. |
| 2008/0120335 | A1 | 5/2008 | Dolgoff |
| 2009/0132095 | A1 | 5/2009 | Sekiai et al. |
| 2011/0184555 | A1 | 7/2011 | Kosuge et al. |
| 2011/0314796 | A1 | 12/2011 | Nakamura et al. |
| 2012/0253514 | A1* | 10/2012 | Sugimoto .......... G05B 13/0265 700/250 |
| 2015/0133339 | A1 | 5/2015 | Prindle et al. |
| 2015/0236549 | A1 | 8/2015 | Budde |
| 2016/0041074 | A1 | 2/2016 | Pliskin |
| 2017/0051681 | A1 | 2/2017 | Arias Chao et al. |
| 2017/0061796 | A1 | 3/2017 | Osagawa |
| 2017/0217477 | A1 | 8/2017 | Akatsuka et al. |
| 2017/0255177 | A1 | 9/2017 | Tokuda et al. |
| 2017/0364831 | A1* | 12/2017 | Ghosh ..................... G06F 11/30 |
| 2018/0043531 | A1 | 2/2018 | Matsumoto et al. |
| 2018/0230967 | A1 | 8/2018 | Beatrice |
| 2019/0121350 | A1* | 4/2019 | Celia ................. G06Q 10/0639 |
| 2020/0266743 | A1* | 8/2020 | Li ........................ G05B 13/027 |
| 2021/0201176 | A1* | 7/2021 | Dhingra ................... G06N 5/04 |
| 2021/0278825 | A1* | 9/2021 | Wen ....................... G06N 3/084 |

FOREIGN PATENT DOCUMENTS

| | | |
|---|---|---|
| JP | 2009-128972 A | 6/2009 |
| JP | 2009-198137 A | 9/2009 |
| JP | 2012-053505 A | 3/2012 |
| JP | 2013-206363 A | 10/2013 |
| JP | 2017-157112 A | 9/2017 |
| JP | 2018-24036 A | 2/2018 |
| JP | 2018-178900 A | 11/2018 |
| JP | 2018-185678 A | 11/2018 |

OTHER PUBLICATIONS

Summers, T., et al., "Stochastic optimal power flow based on conditional value at risk and distributional robustness," International Journal of Electrical Power & Energy Systems, vol. 72, Elsevier Science, Nov. 2015, pp. 116-125.

U.S. Office Action dated Jan. 18, 2022, in related U.S. Appl. No. 16/797,515.

U.S. Office Action dated Jun. 10, 2022, in related U.S. Appl. No. 16/797,515.

Japanese Office Action dated Nov. 1, 2022, in corresponding Japanese Patent Application 2019-039032.

\* cited by examiner

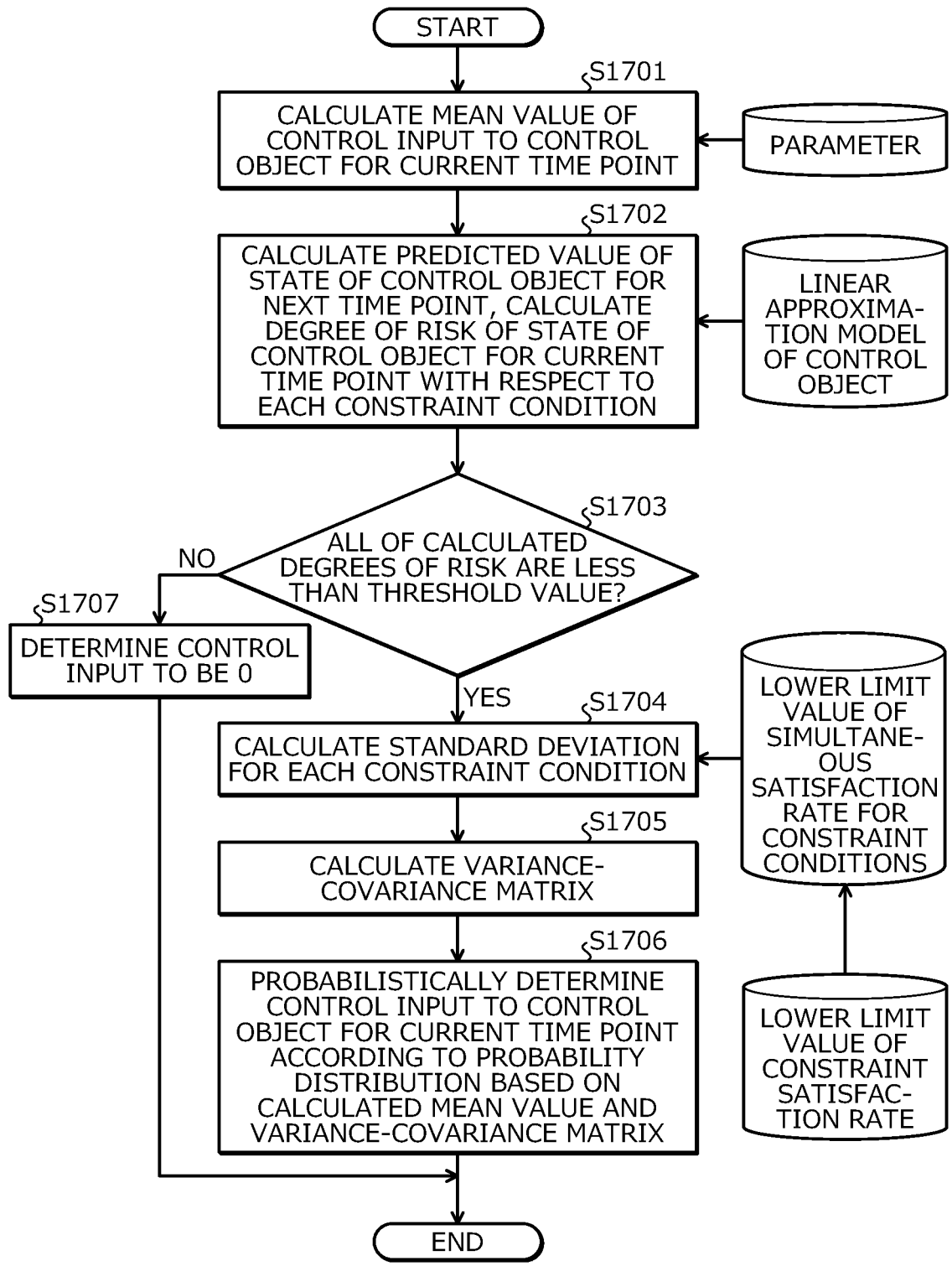

REINFORCEMENT LEARNING METHOD AND REINFORCEMENT LEARNING SYSTEM

CROSS REFERENCE TO RELATED APPLICATIONS

This application is based upon and claims the benefit of priority of the prior Japanese Patent Application No. 2019-039031, filed on Mar. 4, 2019, the entire contents of which are incorporated herein by reference.

FIELD

The embodiments discussed herein related to reinforcement learning technology.

BACKGROUND

Conventionally, in a technique of reinforcement learning, a policy for optimizing a value function defining a value of a control input to a control object is learned based on a cumulative cost or a cumulative reward from the control object by referring to an immediate cost or an immediate reward from the control object corresponding to the control input to the control object. The value function is a state action value function (Q function) or a state value function (V function), etc.

In a conventional technique, for example, a method of generating a control signal applied to a plant is autonomously learned so that a cost evaluation value obtained by evaluating a plant operation cost is optimized. In another technique, for example, a search range of a control parameter is determined based on knowledge information in which an amount of change of the control parameter used for calculating an operation signal is correlated with an amount of change of a state of a plant. In another technique, for example, a correction signal for an operation signal is generated when a second error defined as an error from a target value of a second measurement signal of a plant is larger than a first error defined as an error from a target value of a first measurement signal of the plant. For examples of such techniques, refer to Japanese Laid-Open Patent Publication No. 2012-53505, Japanese Laid-Open Patent Publication No. 2017-157112, and Japanese Laid-Open Patent Publication No. 2009-128972.

SUMMARY

According to an embodiment, a computer-implemented reinforcement learning method includes determining, based on a target probability of satisfaction of a constraint condition related to a state of a control object and a specific time within which a controller causes the state of the control object not satisfying the constraint condition to be the state of the control object satisfying the constraint condition, a parameter of a reinforcement learner that causes, in a specific probability, the state of the control object to satisfy the constraint condition at a first timing following a second timing at which the state of control object satisfies the constraint condition; and determining a control input to the control object by either the reinforcement learner or the controller, based on whether the state of the control object satisfies the constraint condition at a specific timing.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a flowchart depicting an example of the determination process procedure in operation example 2.

DESCRIPTION OF THE INVENTION

First, problems associated with the conventional techniques will be discussed. In the conventional techniques, a probability of the state of the control object violating a constraint condition related to the state of the control object may increase during learning of a policy through reinforcement learning. This is because if the current state of the control object does not satisfy the constraint condition, the probability of the state of the control object satisfying the constraint condition at the next time point cannot be assured in the conventional techniques. Therefore, regardless of the current state of the control object, the probability that the state of the control object at the next time point will satisfy the constraint condition related to the state of the control object cannot be assured to be made equal to or greater than a certain level. Additionally, if the state of the control object violates the constraint condition related to the state of the control object, the control object may be adversely affected.

Embodiments of a reinforcement learning method, a reinforcement learning program, and a reinforcement learning system will be described in detail with reference to the accompanying drawings.

Figure 1:
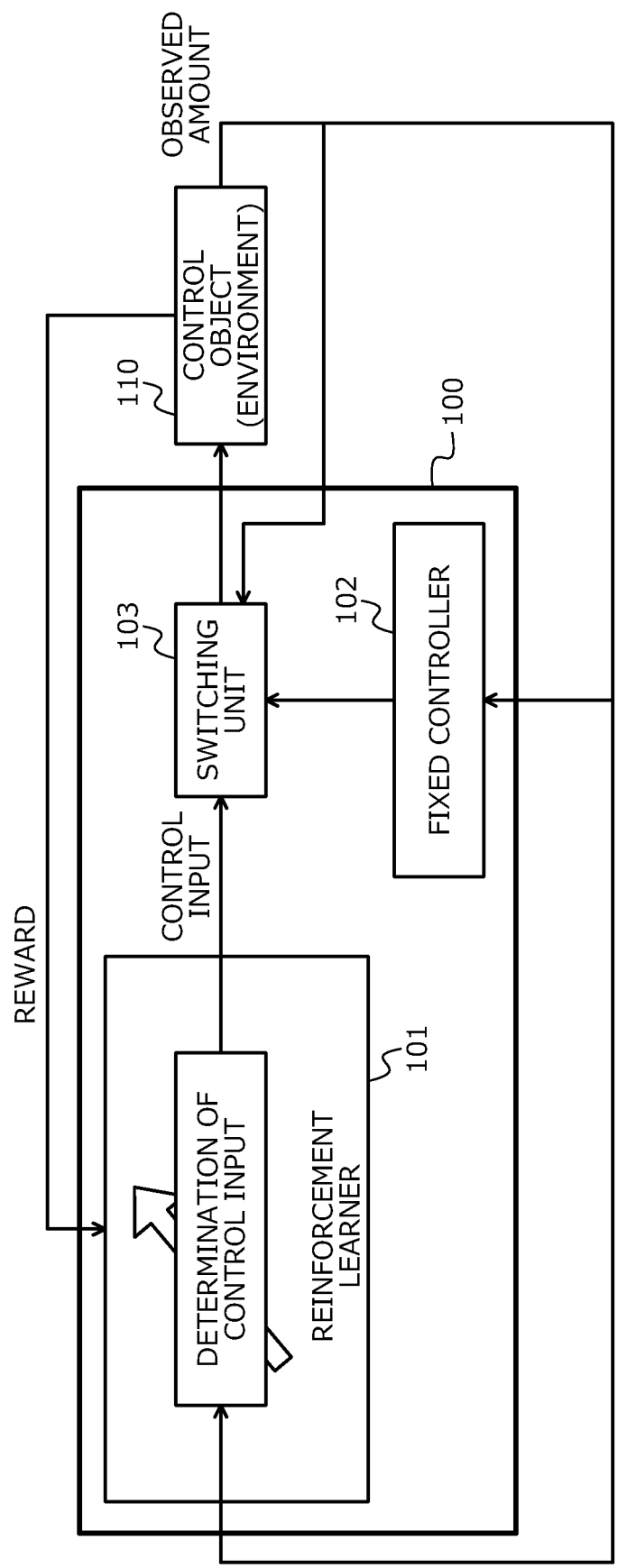
FIG. 1 is an explanatory diagram of an example of a reinforcement learning method according to an embodiment.

FIG. 1 is an explanatory diagram of an example of a reinforcement learning method according to an embodiment. An information processing apparatus 100 is a computer for controlling a control object 110 by reinforcement learning. The information processing apparatus 100 is a server, a personal computer (PC), or a microcontroller, for example.

The control object is some sort of event/matter, for example, an actually existing physical system. The control object is also referred to as an environment. For example, the control object 110 may exist on a simulator. For example, the control object is an automobile, an autonomous mobile robot, an industrial robot, a drone, a helicopter, a server room, a power-generating facility, a chemical plant, or a game.

Reinforcement learning is a technique of learning a policy for controlling the control object 110. The policy is a control law for determining a control input to the control object 110. The control input is also referred to as an action. In the reinforcement learning, for example, a control input to the control object 110 is determined, and a policy for optimizing a value function is learned by referring to a state of the control object 110, the determined control input, and an immediate cost or an immediate reward from the control object 110 observed according to the determined control input.

The value function is a function defining a value of the control input to the control object 110, based on a cumulative cost or a cumulative reward from the control object 110. The value function is a state action value function (Q function) or a state value function (V function), for example. The value function is expressed by using a state basis function, for example. The optimization corresponds to minimization related to a value function that is based on the cumulative cost and corresponds to maximization related to a value function that is based on the cumulative reward. The reinforcement learning may be implemented even when a property of the control object 110 is unknown, for example. For the reinforcement learning, for example, Q learning, SARSA, or actor-critic is utilized.

When a constraint condition exists for the state of the control object 110, it is desirable to learn a policy capable of controlling the control object 110 while satisfying the constraint condition, and additionally, it is desirable that the constraint condition is satisfied even during learning of the policy through the reinforcement learning. Additionally, it may be desirable to make an evaluation possible before start of the reinforcement learning, in terms of a level to which the probability of the state of the control object 110 violating the constraint condition can be suppressed during learning of the policy through the reinforcement learning. A violation means that the constraint condition is not satisfied.

For example, when the reinforcement learning is applied to the control object 110 that actually exists rather than being implemented on a simulator, the violation of the constraint condition may adversely affect the control object 110 the actually exists. For example, when the control object 110 is a server room and the constraint condition is to keep the temperature of the server room equal to or less than a certain level, the violation of the constraint condition may make a server in the server room vulnerable to failure. For example, when the control object 110 is a windmill and the constraint condition is to keep the rotation speed of the windmill equal to or less than a certain level, the violation of the constraint condition may make the windmill vulnerable to damage.

As described above, the control object 110 the actually exists may be adversely affected. Therefore, it is desirable for the constraint condition to be satisfied during learning of the policy through the reinforcement learning. Additionally, it is therefore desirable to make an evaluation possible before start of the reinforcement learning, in terms of a level to which the probability of the state of the control object 110 violating the constraint condition can be suppressed during learning of the policy through the reinforcement learning. It is also desirable to preliminarily enable evaluation of whether a magnitude of an adverse effect on the control object 110 that actually exists can be kept within an allowable range.

However, the conventional reinforcement learning does not consider whether the state of the control object 110 satisfies the constraint condition when the control input to the control object 110 is determined during learning of the policy. Therefore, the probability that the state of the control object 110 violates the constraint condition increases during learning of the policy. Additionally, the learned policy may not be a policy that enables the control of the control object 110 in a manner satisfying the constraint condition. For conventional reinforcement learning, for example, see Doya, Kenji, "Reinforcement learning in continuous time and space," Neural Computation 12.1 (2000): 219-245.

In this regard, an improved technique of giving a penalty in the case of violation of the constraint condition in the conventional reinforcement learning described above is conceivable. This improved method enables learning of a policy that enables the control of the control object 110 in a manner that satisfies the constraint condition; however, the constraint condition cannot be satisfied during learning of the policy through the reinforcement learning.

On the other hand, even when the constraint condition can be satisfied during learning of the policy through the reinforcement learning, it is undesirable to cause deterioration of learning efficiency. For example, although it is conceivable that a range for determining a control input is fixed to a relatively narrow range during learning of the policy through the reinforcement learning, this may cause a deterioration of learning efficiency and is undesirable from the viewpoint of learning efficiency.

Alternatively, a reinforcement learner may be able to assure that, if the state of the control object 110 satisfies the constraint condition at a time point, the state of the control object 110 at the next time point satisfies the constraint condition with a specific probability. In this case, the reinforcement learner does not consider a situation after the state of the control object 110 no longer satisfies the constraint condition, and this may make it difficult to assure that the probability of satisfaction of the constraint condition is made equal to or greater than a certain level during learning of the policy through the reinforcement learning. For example, it is difficult to assure that the probability of satisfaction of the constraint condition is made equal to or greater than a certain level during learning of the policy through continuous type reinforcement learning. In the continuous type, even when the constraint condition is violated, the learning of the policy is continued without initializing the state of the control object 110.

In another conceivable technique, the control object 110 is accurately modeled through a preliminary experiment and the range for determining the control input is adjusted by using the accurate model of the control object 110 so as to reduce the probability of violation of the constraint condition. This technique cannot be applied when accurate modeling is difficult. Additionally, when the accurate model of the control object 110 is a complex model, this method leads to an increase in calculation load related to the reinforcement learning. For this method, for example, see Summers, Tyler, et al, "Stochastic optimal power flow based on conditional value at risk and distributional robustness," International Journal of Electrical Power & Energy Systems 72 (2015): 116-125.

Therefore, in this embodiment, description will be made of a reinforcement learning method in which a reinforcement learner 101 and a fixed controller 102 may selectively be used for determining the control input to the control object 110. This reinforcement learning method may improve the probability of the state of the control object 110 satisfying the constraint condition during learning of the policy through the reinforcement learning.

As depicted in FIG. 1, the information processing apparatus 100 includes the reinforcement learner 101 and the fixed controller 102. When the state of the control object 110 satisfies the constraint condition at a first time point, the reinforcement learner 101 may assure that the state of the control object 110 satisfies the constraint condition at a second time point subsequent to the first time point with a specific probability. The fixed controller 102 may make a transition from the state of the control object 110 not satisfying the constraint condition to the state of the control object 110 satisfying the constraint condition within a specific time.

The information processing apparatus 100 determines a parameter of the reinforcement learner 101 based on a target probability of satisfaction of the constraint condition related to the state of the control object 110 and a specific time related to the fixed controller 102. For example, the information processing apparatus 100 determines the parameter of the reinforcement learner 101 such that the specific probability becomes a probability that is higher than the target probability and that is calculated based on the specific time and the target probability. The parameter is a lower limit value specified as the specific probability for the reinforcement learner 101.

The information processing apparatus 100 then performs the reinforcement learning by repeating a series of processes of outputting the control input to the control object 110, observing the state of the control object 110 and an immediate reward from the control object 110, and updating the policy. The reinforcement learning is of the continuous type, for example. For example, when performing the reinforcement learning, the information processing apparatus 100 determines the control input to the control object 110 with either the reinforcement learner 101 or the fixed controller 102 based on whether the state of the control object 110 at a time point satisfies the constraint condition.

In the example of FIG. 1, for example, the information processing apparatus 100 causes each of the reinforcement learner 101 and the fixed controller 102 to determine a control input to the control object 110. For example, the information processing apparatus 100 causes a switching unit 103 to determine the control input determined by either the reinforcement learner 101 or the fixed controller 102 as the control input actually output to the control object 110.

As a result, the information processing apparatus 100 may selectively use the reinforcement learner 101 and the fixed controller 102 to determine the control input to the control object 110. When the state of the control object 110 violates the constraint condition, the information processing apparatus 100 may repeatedly use the fixed controller 102 to determine the control input and thereby return the state of the control object 110 from a state that violates the constraint condition to a state that satisfies the constraint condition. Therefore, the information processing apparatus 100 may prevent the constraint condition from being continuously violated.

The information processing apparatus 100 may consider a reduction in probability of satisfaction of the constraint condition in the reinforcement learning due to a specific time required when the state of the control object 110 is returned from the state that violates the constraint condition to the state that satisfies the constraint condition. Therefore, when using the reinforcement learner 101, the information processing apparatus 100 may set the parameter of the reinforcement learner 101 so as to assure that the probability of the state of the control object 110 satisfying the constraint condition is made equal to or greater than a preset target probability.

Thus, the information processing apparatus 100 may increase the probability of satisfaction of the constraint condition in the entire reinforcement learning. For example, the information processing apparatus 100 may assure that the probability of satisfaction of the constraint condition is made equal to or greater than the target probability in the entire reinforcement learning.

The constraint condition in this case is set as one or more conditions. Operation example 1 will be described later in detail with reference to FIGS. 5 to 7 as an example in which the information processing apparatus 100 determines the control input to the control object 110 when one constraint condition is set. On the other hand, operation example 2 will be described later in detail with reference to FIGS. 14 to 15 as an example in which the information processing apparatus 100 determines the control input to the control object 110 when multiple constraint conditions are set.

Although the information processing apparatus 100 includes the reinforcement learner 101 and the fixed controller 102 in this description, the present invention is not limited hereto. For example, an apparatus other than the information processing apparatus 100 may include the reinforcement learner 101 and the fixed controller 102. In this case, the information processing apparatus 100 determines the control input to the control object 110 in cooperation with the apparatus including the reinforcement learner 101 and the fixed controller 102.

Although the information processing apparatus 100 determines the parameter of the reinforcement learner 101 in this description, the present invention is not limited hereto. For example, an apparatus other than the information processing apparatus 100 may determine the parameter of the reinforcement learner 101. In this case, the information processing apparatus 100 obtains the parameter of the reinforcement learner 101 from the apparatus that determines the parameter of the reinforcement learner 101.

Figure 2:
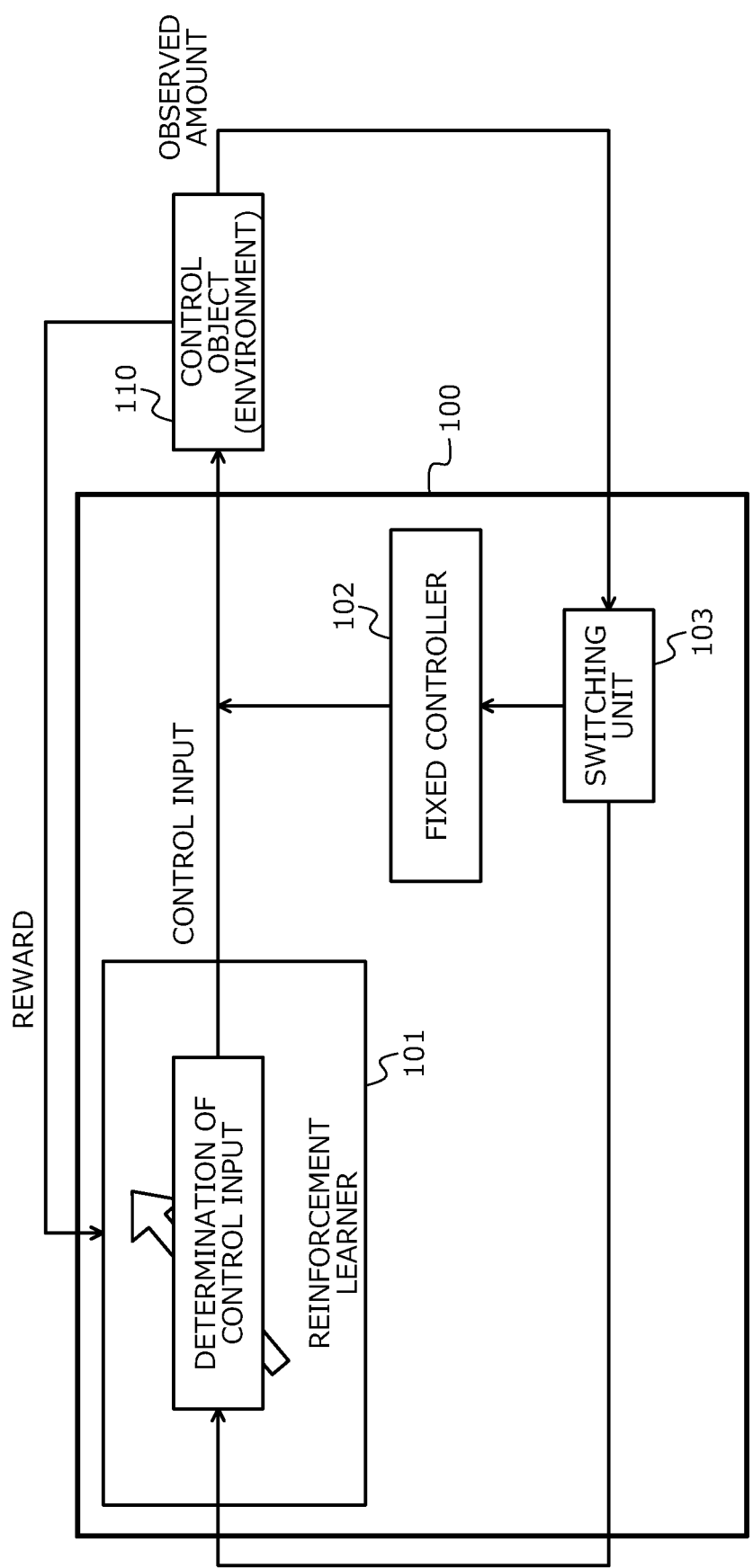
FIG. 2 is an explanatory diagram of another example of the reinforcement learning method according to the embodiment.

Although the switching unit 103 is present at a stage after the reinforcement learner 101 and the fixed controller 102 in this description, the present invention is not limited hereto. As depicted in FIG. 2, the switching unit 103 may be present at a stage before the reinforcement learner 101 and the fixed controller 102. With reference to FIG. 2, description will then be made of a case in which the switching unit 103 is present at a stage before the reinforcement learner 101 and the fixed controller 102.

FIG. 2 is an explanatory diagram of another example of the reinforcement learning method according to the embodiment. As depicted in FIG. 2, the information processing apparatus 100 includes the reinforcement learner 101 and the fixed controller 102.

The information processing apparatus 100 determines the parameter of the reinforcement learner 101, based on a target probability of satisfaction of the constraint condition related to the state of the control object 110 and the specific time related to the fixed controller 102. For example, the information processing apparatus 100 determines the parameter of the reinforcement learner 101 such that the specific probability is set to a probability that is higher than the target probability and that is calculated based on the specific time and the target probability.

The information processing apparatus 100 then performs the reinforcement learning by repeating a series of processes of outputting the control input to the control object 110, observing the state of the control object 110 and an immediate reward from the control object 110, and updating the policy. The reinforcement learning is of the continuous type, for example. For example, when performing the reinforcement learning, the information processing apparatus 100 determines the control input to the control object 110 with either the reinforcement learner 101 or the fixed controller 102, based on whether the state of the control object 110 at a time point satisfies the constraint condition.

In the example of FIG. 2, for example, the information processing apparatus 100 causes the switching unit 103 to allow either the reinforcement learner 101 or the fixed controller 102 to determine the control input to the control object 110. In particular, the information processing apparatus 100 causes the switching unit 103 to transmit information such as the state of the control object 110 used for determining the control input to the control object 110 so as to allow either the reinforcement learner 101 or the fixed controller 102 to determine the control input to the control object 110. For example, the information processing apparatus 100 then determines, as the control input actually output to the control object 110, the control input determined by either the reinforcement learner 101 or the fixed controller 102.

As a result, the information processing apparatus 100 may selectively use the reinforcement learner 101 and the fixed controller 102 to determine the control input to the control object 110. When the state of the control object 110 violates the constraint condition, the information processing apparatus 100 may repeatedly use the fixed controller 102 to determine the control input and thereby, return the state of the control object 110 from the state violating the constraint condition to the state satisfying the constraint condition. Therefore, the information processing apparatus 100 may prevent the constraint condition from being continuously violated.

The information processing apparatus 100 may consider a reduction in probability of satisfaction of the constraint condition in the reinforcement learning due to a specific time required when the state of the control object 110 is returned from the state violating the constraint condition to the state satisfying the constraint condition. Therefore, when using the reinforcement learner 101, the information processing apparatus 100 may set the parameter of the reinforcement learner 101 so as to assure that the probability of the state of the control object 110 satisfying the constraint condition is made equal to or greater than a preset target probability.

From the above, the information processing apparatus 100 may increase the probability of satisfaction of the constraint condition in the entire reinforcement learning. For example, the information processing apparatus 100 may assure that the probability of satisfaction of the constraint condition is made equal to or greater than the target probability in the entire reinforcement learning. Additionally, the information processing apparatus 100 may cause either the reinforcement learner 101 or the fixed controller 102 to determine the control input to the control object 110 without causing the other to determine the control input to the control object 110 and therefore may reduce a processing load.

Figure 3:
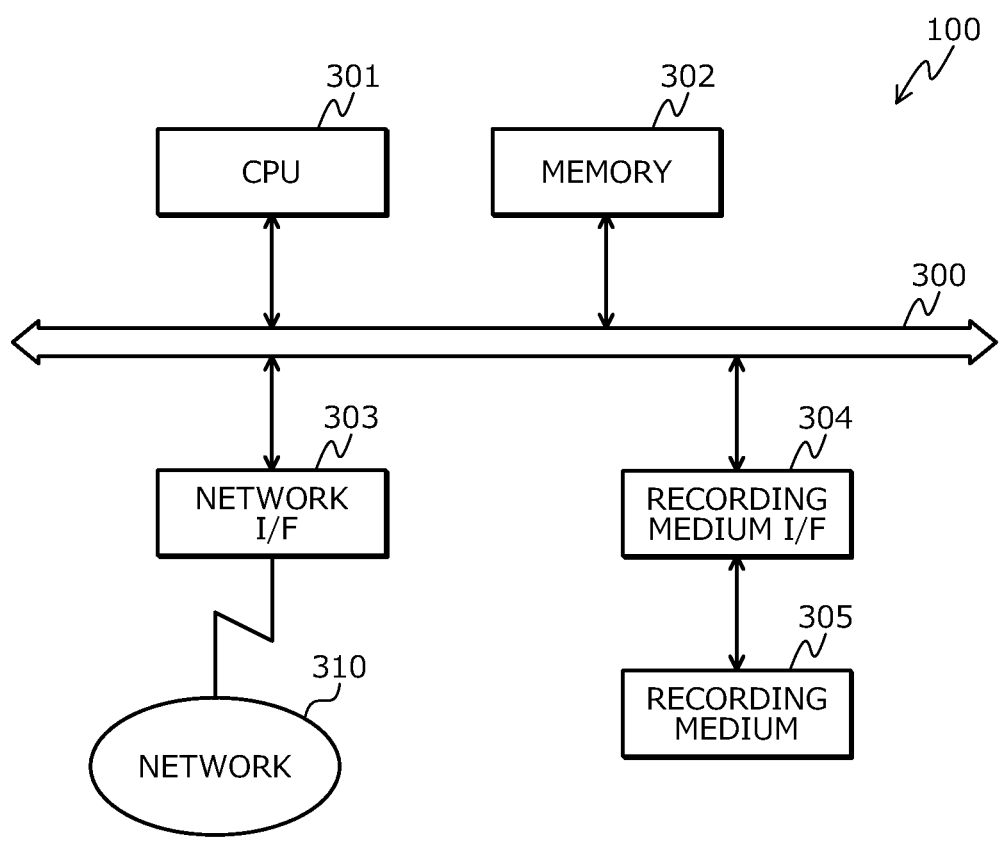
FIG. 3 is a block diagram depicting a hardware configuration example of an information processing apparatus 100.

A hardware configuration example of the information processing apparatus 100 depicted in FIG. 1 or 2 will be described with reference to FIG. 3. FIG. 3 is a block diagram depicting a hardware configuration example of the information processing apparatus 100. In FIG. 3, the information processing apparatus 100 includes a central processing unit (CPU) 301, a memory 302, a network interface (I/F) 303, a recording medium I/F 304, and a recording medium 305. The constituent units are connected to each other through a bus 300.

The CPU 301 is responsible for the overall control of the information processing apparatus 100. The memory 302 includes a read only memory (ROM), a random access memory (RAM), and a flash ROM, for example. For example, the flash ROM and the ROM store various programs and the RAM is used as a work area of the CPU 301. The programs stored in the memory 302 are loaded to the CPU 301 so that coded processes are executed by the CPU 301.

The network I/F 303 is connected to a network 310 through a communication line and is connected to another computer via the network 310. The network I/F 303 is responsible for an internal interface with the network 310 and controls input/output of data from the other computer. The network I/F 303 is a modem or a local area network (LAN) adapter, for example.

The recording medium I/F 304 controls the reading and writing of data to the recording medium 305 under the control of the CPU 301. The recording medium I/F 304 is a disk drive, a solid-state drive (SSD), or a universal serial bus (USB) port, for example. The recording medium 305 is a nonvolatile memory storing data written thereto under the control of the recording medium I/F 304. The recording medium 305 is a disk, a semiconductor memory, or a USB memory, for example. The recording medium 305 may be detachable from the information processing apparatus 100.

In addition to the constituent units described above, for example, the information processing apparatus 100 may include a keyboard, a mouse, a display, a printer, a scanner, a microphone, and a speaker. The information processing apparatus 100 may include multiple recording medium I/Fs 304 and recording media 305. Alternatively, the information processing apparatus 100 may not include the recording medium I/F 304 and the recording medium 305.

Figure 4:
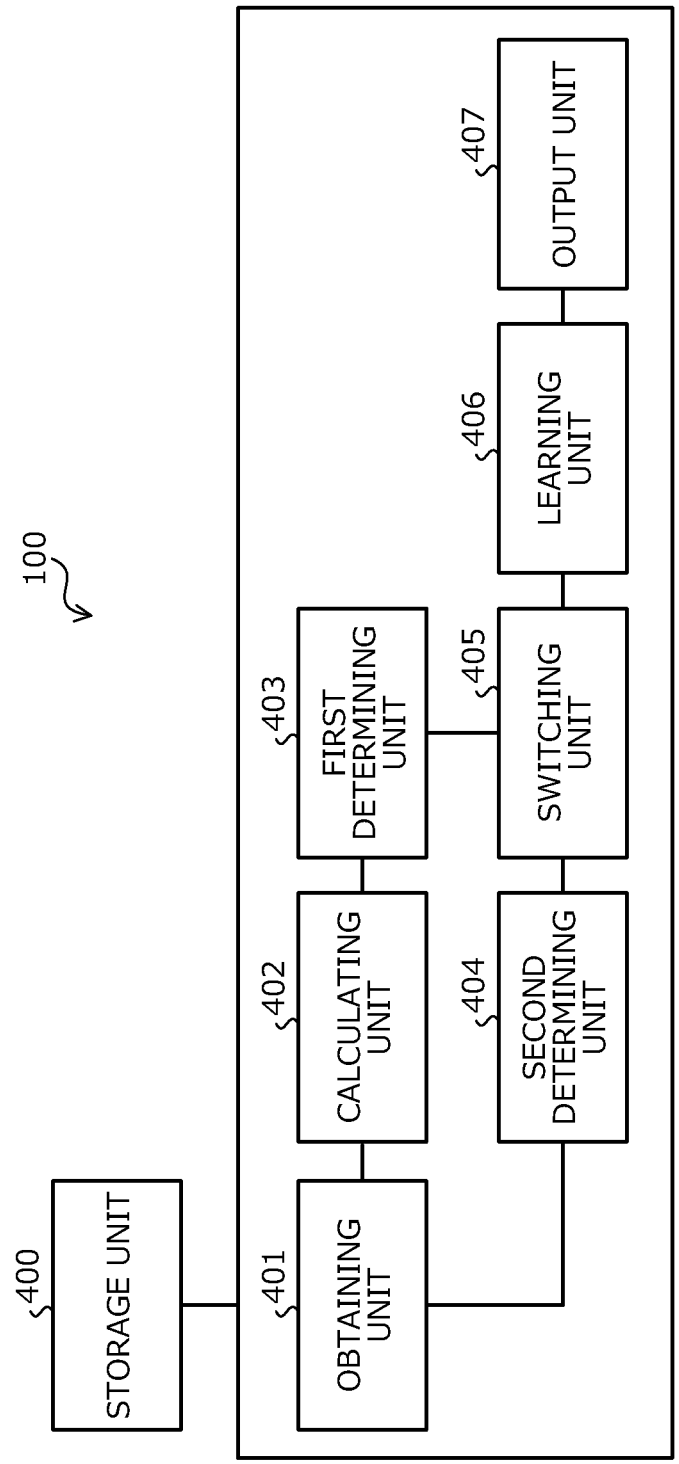
FIG. 4 is a block diagram depicting a functional configuration example of the information processing apparatus 100.

A functional configuration example of the information processing apparatus 100 will be described with reference to FIG. 4. FIG. 4 is a block diagram depicting a functional configuration example of the information processing apparatus 100. The information processing apparatus 100 includes a storage unit 400, an obtaining unit 401, a calculating unit 402, a first determining unit 403, a second determining unit 404, a switching unit 405, a learning unit 406, and an output unit 407.

For example, the storage unit 400 is implemented by storage areas of the memory 302, the recording medium 305, etc. depicted in FIG. 3. Although the storage unit 400 is included in the information processing apparatus 100 in the following description, the present invention is not limited hereto. For example, the storage unit 400 may be included in an apparatus different from the information processing apparatus 100 so that storage contents of the storage unit 400 may be referred to by the information processing apparatus 100.

The obtaining unit 401 to the output unit 407 function as an example of a control unit. For example, functions of the obtaining unit 401 to the output unit 407 are implemented by the CPU 301 executing a plurality of instructions in programs stored in the storage areas of the memory 302, the recording medium 305, etc. depicted in FIG. 3, or by the network I/F 303. The process results of the functional units are stored to the storage areas of the memory 302, the recording medium 305, etc. depicted in FIG. 3, for example.

The storage unit 400 is referred to in the processes of the functional units or stores various types of information to be updated. The storage unit 400 accumulates the state of the control object 110, the control input to the control object 110, and the immediate cost or the immediate reward from the control object 110. As a result, the storage unit 400 may enable the functional units to refer to the state of the control object 110, the control input to the control object 110, and the immediate cost or the immediate reward from the control object 110.

For example, the control object 110 may be a power generation facility. The power generation facility is, for example, a wind power generation facility. In this case, the control input is, for example, torque of a generator of the power generation facility. The state is, for example, at least one of a power generation amount of the power generation facility, a rotation amount of a turbine of the power generation facility, a rotation speed of the turbine of the power generation facility, a wind direction with respect to the power generation facility, and a wind speed with respect to the power generation facility. The reward is, for example, a power generation amount of the power generation facility. The power generation facility is, for example, a thermal power generation facility, a solar power generation facility, or a nuclear power generation facility.

For example, the control object 110 may be an industrial robot. In this case, the control input is, for example, a torque of a motor of the industrial robot. The state is, for example, at least one of an image taken by the industrial robot, a joint position of the industrial robot, a joint angle of the industrial robot, and a joint angular speed of the industrial robot. The reward is, for example, a production amount of products of the industrial robot. The production amount is, for example, an assembly count. The assembly count is, for example, the number of products assembled by the industrial robot.

For example, the control object may be air conditioning equipment. For example, the air conditioning equipment is in a server room. In this case, the control input is, for example, at least one of a set temperature of the air conditioning equipment and a set air volume of the air conditioning equipment. The state is, for example, at least one of an actual temperature inside a room that has the air conditioning equipment, an actual temperature outside the room that has the air conditioning equipment, and weather. The cost is, for example, power consumption of the air conditioning equipment.

The storage unit 400 stores model information. The model information defines a relationship between the state of the control object 110 and the control input to the control object 110. For example, the model information uses a variable indicative of the state of the control object 110 at the first time point and a variable indicative of the control input to the control object 110 at the first time point to represent linear approximation of a function of the state of the control object 110 at a second time point subsequent to the first time point. For example, the second time point is a time point after a unit time from the first time point.

The storage unit 400 stores a value function. For example, the value function defines a value of the control input to the control object 110 based on the cumulative cost or the cumulative reward from the control object 110. For example, the value function is represented by using a state basis function. The value function is a state action value function (Q function) or a state value function (V function), etc. The storage unit 400 stores a parameter of the value function, for example. As a result, the storage unit 400 may enable the functional units to refer to the value function.

The storage unit 400 stores a policy for controlling the control object 110. For example, the policy is a control law for determining a control input to the control object 110. For example, the storage unit 400 stores a parameter w of the policy. As a result, the storage unit 400 may make the control input to the control object 110 decidable by the policy. The storage unit 400 stores one or multiple control conditions related to the state of the control object 110. As a result, the storage unit 400 may enable the functional units to refer to the control conditions.

The storage unit 400 stores the reinforcement learner 101. The reinforcement learner 101 is a controller for controlling the control object 110. The reinforcement learner 101 assures that when the state of the control object 110 satisfies the constraint condition at the first time point, the state of the control object 110 satisfies, with a specific probability, the constraint condition at the second time point subsequent to the first time point. When multiple constraint conditions exist, the reinforcement learner 101 may assure that when the state of the control object 110 simultaneously satisfies the multiple constraint conditions at the first time point, the state of the control object 110 simultaneously satisfies, with a specific probability, the multiple constraint conditions at the second time point subsequent to the first time point. The storage unit 400 stores a parameter of the reinforcement learner 101, for example. As a result, the storage unit 400 may enable the first determining unit 403 to refer to the reinforcement learner 101.

The storage unit 400 stores the fixed controller 102. The fixed controller 102 is a controller for controlling the control object 110. The fixed controller 102 may make a transition from the state of the control object 110 not satisfying the constraint condition to the state of the control object 110 satisfying the constraint condition, within a specific time. As a result, the storage unit 400 may enable the second determining unit 404 to refer to the fixed controller 102.

The storage unit 400 stores the specific time related to the fixed controller 102. For example, the specific time is defined by the number of steps of determining the control input. For example, the steps correspond to processing units for determining the control input and observing the immediate reward or the immediate cost in the reinforcement learning. As a result, the storage unit 400 may enable the first determining unit 403 to refer to the specific time related to the fixed controller 102. In the description hereinafter, a case in which the storage unit 400 accumulates immediate reward will be described as an example.

The obtaining unit 401 obtains various types of information used for the processes of the functional units. The obtaining unit 401 stores the obtained various types of information in the storage unit 400 or outputs to the functional units. The obtaining unit 401 may output the various types of information stored in the storage unit 400 to the functional units. The obtaining unit 401 obtains various types of information based on a user's operation input, for example. The obtaining unit 401 may receive various types of information from an apparatus different from the information processing apparatus 100, for example.

The obtaining unit 401 obtains the state of the control object 110 and the immediate reward from the control object 110 corresponding to the control input to the control object 110. For example, the obtaining unit 401 obtains the state of the control object 110 and the immediate reward from the control object 110 corresponding to the control input to the control object 110 and outputs the state and the immediate reward to the storage unit 400. As a result, the obtaining unit 401 may cause the storage unit 400 to accumulate the state of the control object 110 and the immediate reward from the control object 110 corresponding to the control input to the control object 110. The obtaining unit 401 may cause the calculating unit 402, the first determining unit 403, and the second determining unit 404 to obtain information used at the time of determining of the control input to the control object 110.

The calculating unit 402 refers to the model information for each time point and calculates a predicted value of the state of the control object 110 for a future time point. The time point is a unit time interval. The future time point is a time point after a unit time from a current time point. For example, the calculating unit 402 obtains the predicted value of the state of the control object 110 for a future time point based on the model information and an upper limit of an error included in the predicted value of the state of the control object 110 at a future time point. The upper limit of the error is set in advance by a user. As a result, the calculating unit 402 may calculate a degree of risk of the state of the control object 110 at the current time point with respect to the constraint condition related to the state of the control object 110.

The calculating unit 402 calculates, for each time point, the degree of risk of the state of the control object 110 at the current time point with respect to the constraint condition related to the state of the control object 110, based on the predicted value of the state of the control object 110 at a future time point. For example, the degree of risk indicates how likely it is that the state of the control object 110 at the current time point results in a situation where the state of the control object 110 at a future time point violates the constraint condition.

Based on the predicted value of the state of the control object 110 at a future time point, the calculating unit 402 calculates a degree of risk of the state of the control object 110 at the current time point with respect to each of the multiple constraint conditions related to the state of the control object 110. As a result, the calculating unit 402 may enable the first determining unit 403 to refer to the degree of risk used as an index for defining a range for determining the control input to the control object 110.

The first determining unit 403 sets a parameter for the reinforcement learner 101. The parameter is a probabilistic evaluation index related to satisfaction of the constraint condition. The evaluation index is an index specifying a specific probability with which the reinforcement learner 101 may assure the satisfaction of the constraint condition. For example, the evaluation index is a lower limit value η of the probability of the state of the control object 110 satisfying the constraint condition during use of the reinforcement learner 101. For example, when the multiple constraint conditions exist, the evaluation index is the lower limit value η of the probability of the state of the control object 110 simultaneously satisfying the multiple constraint conditions during use of the reinforcement learner 101. For example, the evaluation index is 0 to 1 and, for example, when the lower limit value of the probability is 90%, the evaluation index is 0.9.

The evaluation index is determined based on a target probability, for example. The target probability is a lower limit value ρ set by the user in terms of the probability of the state of the control object 110 satisfying the constraint condition during the reinforcement learning. When the multiple constraint conditions exist, the target probability is the lower limit value ρ of the probability of the state of the control object 110 simultaneously satisfying the multiple constraint conditions during the reinforcement learning. For example, the target probability is 0 to 1 and, for example, when the lower limit value of the probability is 90%, the target probability is 0.9 and η may be larger than ρ.

The first determining unit 403 sets the parameter of the reinforcement learner 101 based on the target probability and the specific time related to the fixed controller 102. For example, the first determining unit 403 sets the parameter of the reinforcement learner 101 such that the specific probability of assurance of the satisfaction of the constraint condition by the reinforcement learner 101 is set to a probability that is higher than the target probability and calculated based on the specific time and the target probability. For example, the first determining unit 403 sets the probabilistic evaluation index related to satisfaction of the constraint condition to a probability that is higher than the target probability and calculated based on the specific time and the target probability. As a result, the first determining unit 403 may set a parameter of the reinforcement learner 101 with consideration given to a reduction in the probability of satisfaction of the constraint condition caused in the reinforcement learning when the state of the control object 110 is returned from the state violating the constraint condition to the state satisfying the constraint condition.

The first determining unit 403 determines the control input to the control object 110 at the current time by using the reinforcement learner 101 for each time point. For example, the first determining unit 403 determines the control input to the control object 110 at the current time point from a range defined depending on the calculated degree of risk. For example, when the calculated degree of risk is smaller, the defined range becomes wider. As a result, when the calculated degree of risk is larger, the first determining unit 403 may narrow the range for determining the control input to the control object 110 so as to suppress an increase in the probability of the state of the control object 110 violating the constraint condition at a future time point.

For example, when one constraint condition exists, and the calculated degree of risk is equal to or greater than a threshold value, the first determining unit 403 determines a specific value as the control input to the control object 110. The control object 110 may have a property assuring that when the state of the control object 110 at the first time point satisfies the constraint condition and the control input to the control object 110 at the first time point is 0, the state of the control object 110 at the second time point satisfies the constraint condition. The second time point is a time point subsequent to the first time point. For example, the second time point is a time point after a unit time from the first time point. Therefore, the first determining unit 403 may use 0 as a specific value. As a result, the first determining unit 403 may prevent violation of the constraint condition by the state of the control object 110 at a future time point.

For example, when one constraint condition exists, and the calculated degree of risk is less than the threshold value, the first determining unit 403 probabilistically determines the control input to the control object 110 for the current time point under the probabilistic evaluation index related to satisfaction of the constraint condition. The probabilistic decision is to randomly determine the control input according to a probability distribution, from within a range possible for the set control input. For example, the probability distribution is a Gaussian distribution. For example, the Gaussian distribution is defined by a variance-covariance matrix and a mean value of the control input.

For example, when the calculated degree of risk is less than the threshold value, the first determining unit 403 calculates a mean value possible for the control input to the control object 110 at the current time point and calculates the variance-covariance matrix under the evaluation index. For example, the first determining unit 403 then uses the calculated mean value and the variance-covariance matrix to probabilistically determine the control input to the control object 110 at the current time point. In particular, the first determining unit 403 probabilistically determines the control input to the control object 110 for the current time point as described later in operation example 1 with reference to FIGS. 5 to 7. As a result, the first determining unit 403 may make the probability of the state of the control object 110 satisfying the constraint condition at a future time point during use of the reinforcement learner 101 equal to or greater than the probability based on the evaluation index.

For example, when the multiple constraint conditions exist, and the degree of risk calculated for any one of the multiple constraint conditions is equal to or greater than the threshold value, the first determining unit 403 determines a specific value as the control input to the control object 110. The first determining unit 403 may use 0 as the specific value. As a result, the first determining unit 403 may prevent the state of the control object 110 at a future time point from violating the constraint condition.

For example, when the multiple constraint conditions exist, and the degrees of risk calculated for the respective constraint conditions are less than the threshold value, the first determining unit 403 probabilistically determines the control input to the control object 110 for the current time point under the probabilistic evaluation index for simultaneously satisfying the multiple constraint conditions. For example, when the multiple constraint conditions exist, the first determining unit 403 probabilistically determines the control input to the control object 110 for the current time point as described later in operation example 2 with reference to FIGS. 16 and 17. As a result, the first determining unit 403 may make the probability of the state of the control object 110 satisfying the constraint condition at a future time point during use of the reinforcement learner 101 equal to or greater than the probability based on the evaluation index.

The second determining unit 404 determines the control input to the control object 110 at the current time by using the fixed controller 102. As a result, the second determining unit 404 may determine the control input for making a transition from the state violating the constraint condition to the state satisfying the constraint condition within the specific time. For example, the second determining unit 404 may determine the control input for making a transition from the state violating the constraint condition to the state satisfying the constraint condition within a specific number of steps. Therefore, the second determining unit 404 prevents the constraint condition from being continuously violated.

The switching unit 405 determines the control input to the control object 110 with either the reinforcement learner 101 or the fixed controller 102, based on whether the state of the control object 110 at a time point satisfies the constraint condition. For example, when the restriction condition is satisfied, the switching unit 405 determines, as the actual control input to the control object 110, the control input determined by the first determining unit 403 using the reinforcement learner 101. On the other hand, for example, when the constraint condition is not satisfied, the switching unit 405 determines, as the actual control input to the control object 110, the control input determined by the second determining unit 404 using the fixed controller 102.

As a result, the switching unit 405 may selectively use the reinforcement learner 101 and the fixed controller 102 to determine the control input to the control object 110. The switching unit 405 may increase the probability of satisfaction of the constraint condition in the entire reinforcement learning. For example, the switching unit 405 may assure that the probability of satisfaction of the constraint condition is made equal to or greater than the target probability in the entire reinforcement learning.

When the multiple constraint conditions exist, the switching unit 405 determines the control input to the control object 110 with either the reinforcement learner 101 or the fixed controller 102, based on whether the state of the control object 110 at a time point simultaneously satisfies the multiple constraint conditions. For example, when the multiple constraint conditions are simultaneously satisfied, the switching unit 405 determines, as the actual control input to the control object 110, the control input determined by the first determining unit 403 using the reinforcement learner 101. On the other hand, for example, when any one of the constraint conditions is not satisfied, the switching unit 405 determines, as the actual control input to the control object 110, the control input determined by the second determining unit 404 using the fixed controller 102.

As a result, the switching unit 405 may selectively use the reinforcement learner 101 and the fixed controller 102 to determine the control input to the control object 110. The switching unit 405 may increase the probability of satisfaction of the constraint condition in the entire reinforcement learning. For example, the switching unit 405 may assure that the probability of satisfaction of the constraint condition is made equal to or greater than the target probability in the entire reinforcement learning.

The learning unit 406 learns the policy. The learning unit 406 updates the policy based on the control input to the control object 110 determined by the first determining unit 403 or the second determining unit 404, the state of the control object 110 obtained by the obtaining unit 401, and the immediate reward from the control object 110. For example, the learning unit 406 updates a parameter of the policy. As a result, the learning unit 406 may learn the policy capable of controlling the control object 110 so that the constraint condition is satisfied.

The output unit 407 outputs to the control object 110, the control input determined by the first determining unit 403 or the second determining unit 404. For example, the control input is a command value for the control object 110. For example, the output unit 407 outputs the command value for the control object 110 to the control object 110. As a result, the output unit 407 may control the control object 110.

The output unit 407 may output a process result of any of the functional units. A format of the output is, for example, display on a display, print output to a printer, transmission to an external apparatus via the network I/F 303, or storage to the storage areas of the memory 302, the recording medium 305, etc. As a result, the output unit 407 may notify the user of the process result of any of the functional units.

Although the switching unit 405 is present at a stage after the calculating unit 402, the first determining unit 403, and the second determining unit 404 as in FIG. 1 in this description, the present invention is not limited hereto. For example, as in FIG. 2, the switching unit 405 may be present at a stage before the calculating unit 402, the first determining unit 403, and the second determining unit 404 and after the obtaining unit 401. In this case, the switching unit 405 causes the calculating unit 402 and the first determining unit 403 or the second determining unit 404, to obtain the information used for determining the control input to the control object 110 obtained by the obtaining unit 401 and to determine the control input.

Figure 5:
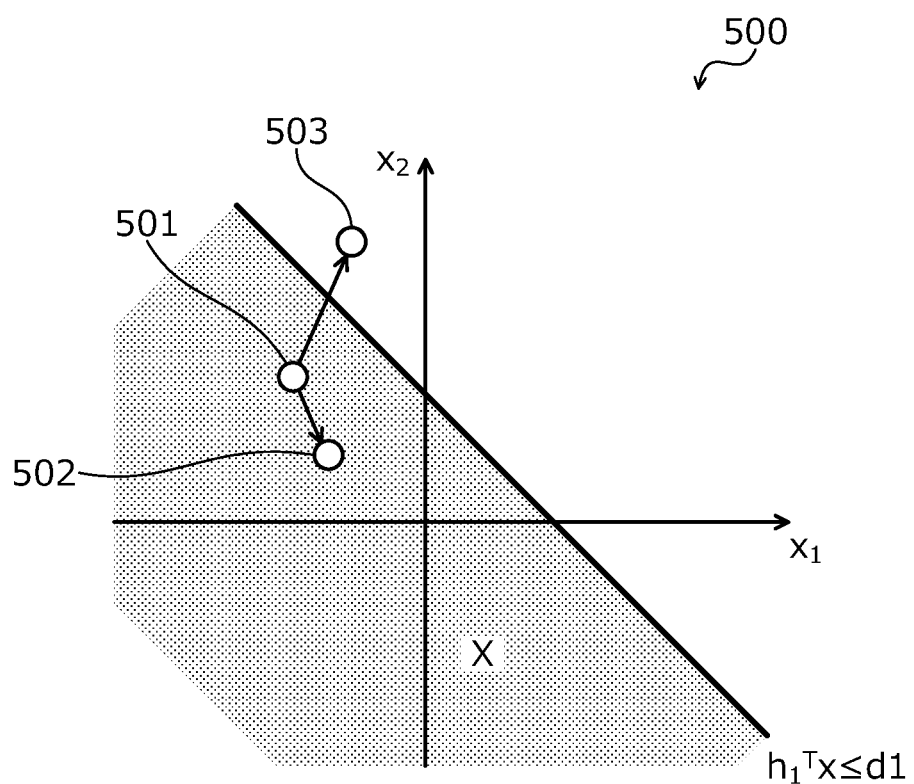
FIG. 5 is an explanatory diagram depicting operation example 1 of the information processing apparatus 100.
Figure 6:
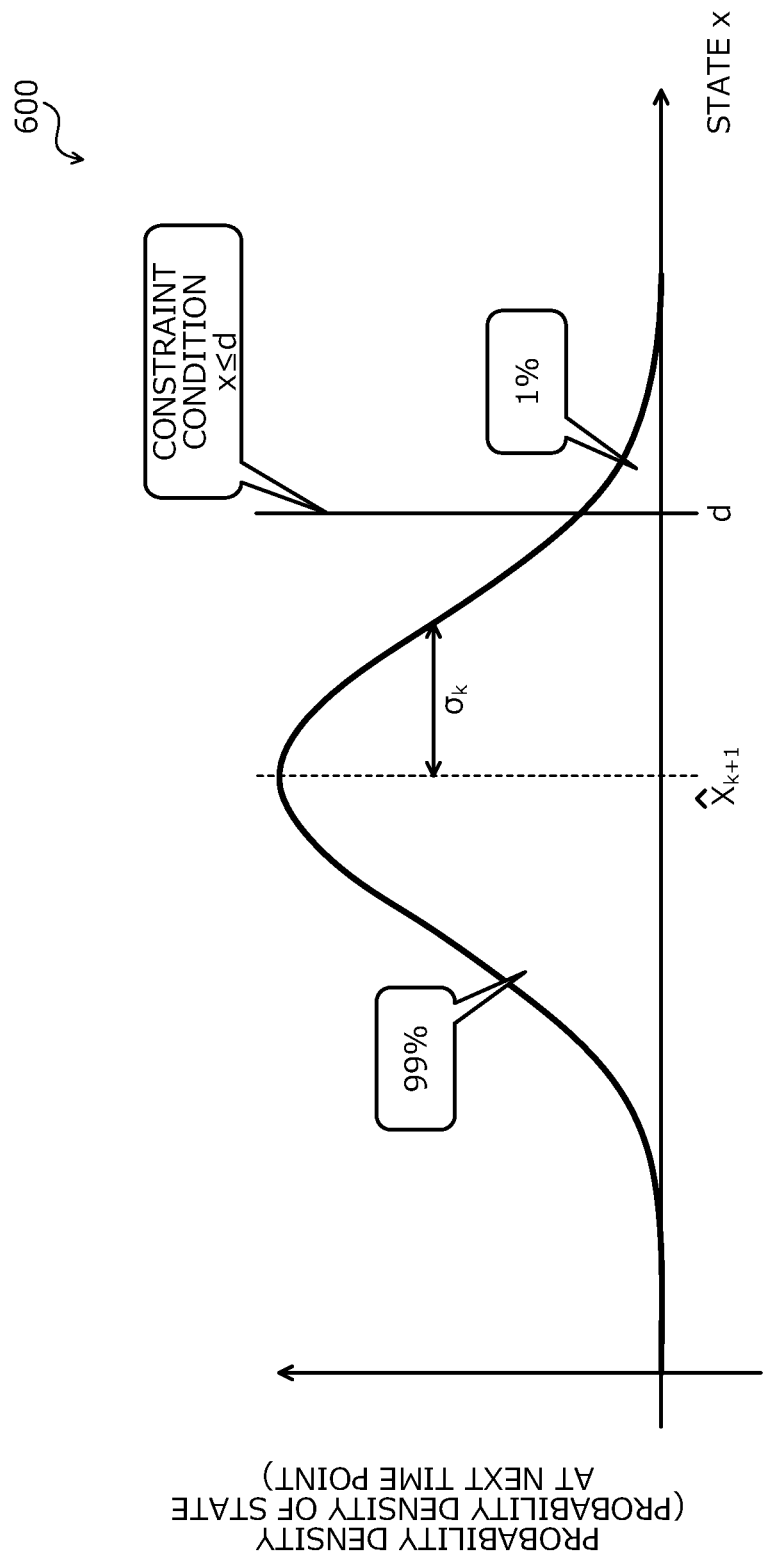
FIG. 6 is an explanatory diagram depicting operation example 1 of the information processing apparatus 100.
Figure 7:
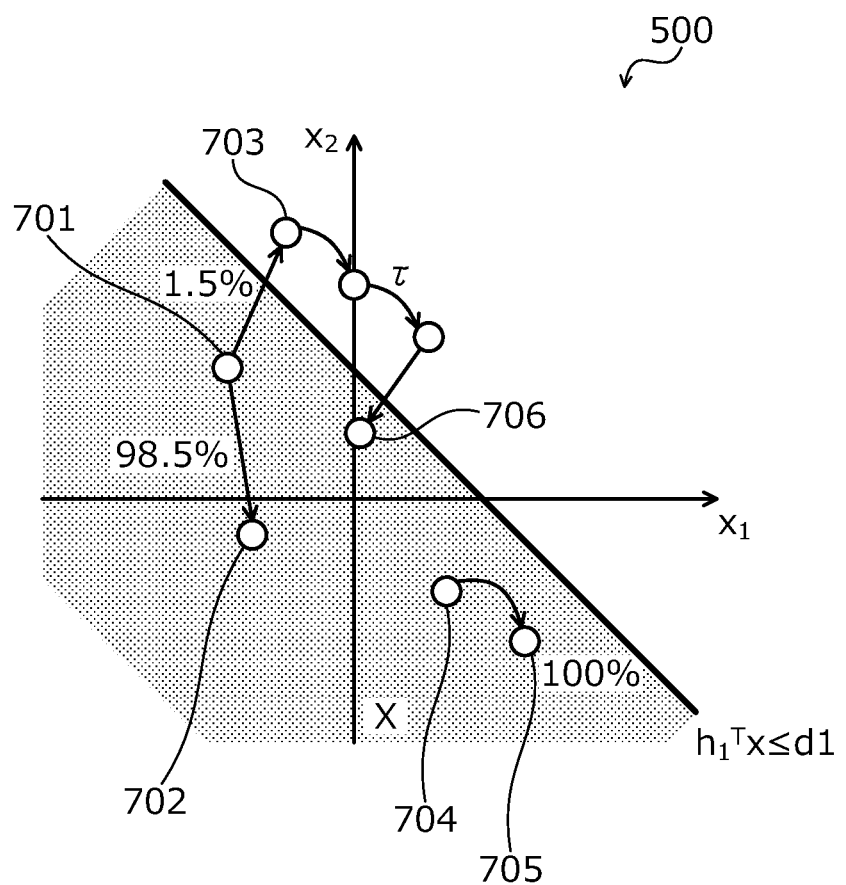
FIG. 7 is an explanatory diagram depicting operation example 1 of the information processing apparatus 100.

Operation example 1 of the information processing apparatus 100 will be described with reference to FIGS. 5 to 7. FIGS. 5, 6, and 7 are explanatory diagrams depicting operation example 1 of the information processing apparatus 100. Operation example 1 corresponds to a case of the information processing apparatus 100 assuring that the probability of the state of the control object 110 satisfying the constraint condition becomes equal to or greater than a certain level during learning of the policy through the continuous type reinforcement learning.

In the following description, first, a flow of operations of the information processing apparatus 100 will be described. Among the operations of the information processing apparatus 100, exemplary operations performed by using the reinforcement learner 101 will then be described with mathematical expressions, and specific examples of the operations of the information processing apparatus 100 will be described with actual examples.

In operation example 1, a control goal is to learn the policy for determining a control input minimizing the cumulative cost. A control purpose is to assure that the probability of satisfaction of a constraint condition $\{f_i\}_i$ related to the state is made equal to or greater than a lower limit value $\rho \in (0,1)$ at all time points during the reinforcement learning for learning the policy and is defined by equations (1) and (2). The constraint condition $\{f_i\}_i$ needs not be linear. Pr(.) denotes the probability that the condition in (.) is satisfied.

$$Pr\{x \in X\} \geq \rho \qquad (1)$$

$$X := \{x \in \mathbb{R}^n | f_i(x_k) \leq 0, \forall i\} \qquad (2)$$

It is assumed that in the case of a state $X_k = x \in X$, a constant $\tau$ independent of the time point k or the state x exists and that a calculation method of a control input sequence for moving the state into X within $\tau$ steps is known. In the following description, "assumption 1" may denote an assumption that the calculation method of the control input sequence is known. In other words, it is assumed that $u_k^{back}(x)$, $u_{k+1}^{back}(x)$, . . . , $u_{k+\tau}^{back}(x)$ satisfying $u_{k+j}^{back}(x) \in X$ ($j \leq \tau$) exist. This leads to the assumption that the fixed controller 102 exists.

Regarding the reinforcement learning and the control object 110, the following three characteristics are assumed. A first characteristic is a property that the reinforcement learning may use a policy of probabilistically determining the control input and may change the variance-covariance matrix of a probability density function used for determining the control input at a timing. A second characteristic is a property that since the control object 110 is linear with respect to the control input and the constraint condition is linear with respect to the state, the variance of the control input that is possible at the first time point is stored for the state of the control object 110 possible at the second time point subsequent to the first time point. A third characteristic is a property that when the control input is 0, no transition is made from a state satisfying the constraint condition to a state not satisfying the constraint condition. This leads to the assumption that the reinforcement learner 101 exists.

The information processing apparatus 100 performs the continuous reinforcement learning by using the reinforcement learner 101 when the current state satisfies the constraint condition and by using the fixed controller 102 when the current state does not satisfy the constraint condition. As described above, the reinforcement learner 101 assures that a constraint satisfaction rate is made equal to or greater than the lower limit value $\eta$, and the fixed controller 102 assures that the state is moved into X within $\tau$ steps. In this case, a combination of the reinforcement learner 101 and the fixed controller 102 may assure that the constraint satisfaction rate is made equal to or greater than a lower limit value $\eta\tau$. The assurance of making the constraint satisfaction rate equal to or greater than the lower limit value $\eta\tau$ is proved based on the following proposition, for example.

It is assumed that $\tau$ is a natural number of 1 or more. It is also assumed that a probability process $\{X_k\}$ is a discrete-time Markov chain having $\{1, 2, \ldots, \tau+1\}$ as a state space and a transition probability matrix represented by equation (3). In this case, the proposition exists that if an initial state $X_0$ satisfies equation (4), equation (5) holds for all k=0, 1, . . . .

$$\begin{bmatrix} \rho_1 & 1-\rho_1 & 0 & \ldots & 0 \\ \rho_2 & 0 & 1-\rho_2 & \ldots & 0 \\ \vdots & \vdots & \vdots & \ddots & \vdots \\ \rho_\tau & 0 & 0 & \ldots & 1-\rho_\tau \\ 1 & 0 & 0 & \ldots & 0 \end{bmatrix} \qquad (3)$$

$$Pr\{X_0 = 1\} = 1 \qquad (4)$$

$$Pr\{X_k = 1\} \geq \rho_1^\tau \qquad (5)$$

Therefore, when the constraint condition is satisfied, the information processing apparatus 100 sets the lower limit value $\eta$ related to the reinforcement learner 101 to a $\tau$-th root of a target probability $\rho$ and uses the reinforcement learner 101 to determine the control input. When the constraint condition is not satisfied, the information processing apparatus 100 uses the fixed controller to determine the control input. As a result, the information processing apparatus 100 may assure that the constraint satisfaction rate is equal to or greater than the target probability $\rho$ during the reinforcement learning.

In operation example 1, the control object 110, the immediate cost, the constraint condition, and the control purpose are defined by equations (6) to (19), and problem setting is performed. Additionally, the characteristics related to the reinforcement learning and the control object 110 assumed in operation example 1 are defined by equations (20) to (25).

$$X_{k+1} = f(x_k) + g(x_k)u_k \qquad (6)$$

equation (6) defines a true model of the control object 110. The true model of the control object 110 needs not be known. The control object 110 is a discrete-time nonlinear system that is affine with respect to the control input; k is a time point indicated by a multiple of a unit time; k+1 is the next time point after an elapse of a unit time from time point k; $x_{k+1}$ is the state at the next time point k+1; $x_k$ is the state at the time point k; and $u_k$ is the control input at time point k. Equation (6) indicates a relationship in which the state $x_{k+1}$ at the next time point k+1 is determined by the state $x_k$ at time point k and the input $u_k$ at time point k. The functions f and g are unknown. The state is a continuous value. The control input is a continuous value.

$$f: \mathbb{R}^n \to \mathbb{R}^n \tag{7}$$

$$g: \mathbb{R}^n \to \mathbb{R}^{n \times m} \tag{8}$$

Equation (7) indicates that the function f is a function converting an n-dimensional array into an n-dimensional array, and n is known. Equation (8) indicates that the function g is a function converting an n-dimensional array into an n×m-dimensional matrix. An outline letter R indicates a real coordinate space. A superscript of the outline letter R indicates the number of dimensions.

$$x_k \in \mathbb{R}^n \tag{9}$$

$$u_k \in \mathbb{R}^m \tag{10}$$

Equation (9) indicates that the state $x_k$ is n-dimensional, and n is known. The state $x_k$ may be directly observed. Equation (10) indicates that the control input $u_k$ is m-dimensional.

$$c_{k+1} = c(x_k, u_k) \tag{11}$$

Equation (11) is an equation for the immediate cost of the control object 110, where $c_{k+1}$ is the immediate cost incurred after a unit time according to the input $u_k$ at time point k, and c(.) is a function for obtaining the immediate cost. Equation (11) indicates a relationship in which the immediate cost $c_{k+1}$ is determined by the state $x_k$ at time point k and the input $u_k$ at time point k.

$$c: \mathbb{R}^n \times \mathbb{R}^m \to [0, \infty) \tag{12}$$

Equation (12) indicates that the function c(.) is a function for obtaining a positive value based on an n-dimensional array and an m-dimensional array.

$$h^T x \le d \tag{13}$$

Equation (13) defines the constraint condition, and x is the state. An array h is set by the user. A superscript T indicates transposition. A variable d is set by the user. The constraint condition is known and is linear with respect to the state x. In operation example 1, one constraint condition exists.

$$h \in \mathbb{R}^n \tag{14}$$

$$d \in \mathbb{R} \tag{15}$$

Equation (14) indicates that the array h is n-dimensional. Equation (15) indicates that the variable d is a real number.

$$X := \{x \in \mathbb{R}^n | h^T x \le d\} \tag{16}$$

Equation (16) represents a set X of states x satisfying the constraint condition. In the following description, an interior point of X may be denoted by $X^{int}$, and $x^* \in X^{int}$ satisfying $f(x^*)=x^*$ and $x^* \in X^{int}$ satisfying $c(x^*,0)=0$ exist.

$$J = \sum_{k=0}^{\infty} \gamma^k c_{k+1} \tag{17}$$

$$\gamma \in (0, 1]: \text{discount rate} \tag{18}$$

Equation (17) is an equation indicative of a cumulative cost J and defines the control purpose of the reinforcement learning. The control purpose of the reinforcement learning is to minimize the cumulative cost J and to learn the policy for determining the control input to minimize the cumulative cost J. The learning of the policy is an update of the parameter w providing the policy, and $\gamma$ is a discount rate. Equation (18) indicates that y is a value between 0 and 1.

$$Pr\{h^T x_k \le d\} \ge \eta \tag{19}$$

Equation (19) defines the control purpose of the reinforcement learning as assuring that the constraint satisfaction rate at all time points is made equal to or greater than a lower limit value $\eta \in (0.5, 1)$ during use of the reinforcement learner 101 with respect to the constraint condition. Pr(.) indicates a probability of satisfaction of the condition in (.).

$$x_{k+1} \approx Ax_k + Bu_k \tag{20}$$

Equation (20) defines a linear approximation model of the control object 110. For example, the linear approximation model is a linear nominal model. It is assumed that the linear approximation model of the control object 110 is known. In the following description, "assumption 2" may denote an assumption that the linear approximation model of the control object 110 is known. A and B are coefficient matrixes.

$$A \in \mathbb{R}^{n \times n} \tag{21}$$

$$B \in \mathbb{R}^{n \times m} \tag{22}$$

Equation (21) indicates that the coefficient matrix A is n×n-dimensional (has n rows and n columns). Equation (22) indicates that the coefficient matrix B is n×m-dimensional (has n rows and m columns).

$$e(x, u; f, g, A, B) := f(x) + g(x)u - (Ax + Bu) =: \\ [e_1(x, u; f, g, A, B), \ldots, e_n(x, u; f, g, A, B)]^T \tag{23}$$

$$\bar{e}_i \ge \sup_{x \in \mathbb{R}^n, u \in \mathbb{R}^m} |e_i(x, u; f, g, A, B)| \tag{24}$$

Equation (23) defines an error function indicative of a modeling error of the linear approximation model of the control object 110 with respect to the true model of the control object 110, and $e_i$ is an error (i=1, 2, . . . , n). It is assumed for equation (23) that bar$\{e_i\} < \infty$ satisfying equation (24) exists and is known, and bar { } indicates that a bar is added to an upper portion of a character. In the following description, "assumption 3" may denote an assumption that bar$\{e_i\} < \infty$ satisfying equation (24) exists and is known. Assumption 3 indicates that the error $e_i$ has a known upper bound.

It is assumed that if $x \in X$, then $f(x) \in X$. In the following description, "assumption 4" may denote an assumption that if $x \in X$, then $f(x) \in X$. As depicted in FIG. 5, assumption 4 indicates that if the state x satisfies the constraint condition and the control input is 0 at a time point, the state x after a transition also satisfies the constraint condition at the next time point.

For example, when the current state is a state 501 in a real coordinate space 500 and the control input is set to 0, a transition to an interior point of the set X such as a state 502 may occur; however, a transition to an exterior point of the set X such as a state 503 does not occur. Therefore, when the control input is 0 during use of the reinforcement learner 101, it may be assured that the constraint satisfaction rate for the state after the transition becomes equal to or greater than the lower limit value $\eta$.

$$h^T B \ne 0 \tag{25}$$

It is assumed that equation (25) holds with respect to the coefficient matrix of the linear approximation model of the control object 110 and the constraint condition. In the following description, "assumption 5" may denote an assumption that equation (25) holds with respect to the coefficient matrix of the linear approximation model of the control object 110 and the constraint condition.

In the problem setting described above, the control object 110 is linear with respect to the control input, and the constraint condition is linear with respect to the state. Therefore, a degree of variance of the control input possible at a time point is correlated with a degree of variance of the state possible at the next time point. Therefore, as depicted in FIG. 6, by adjusting the degree of variance of the control input possible at a time point, the degree of variance of the state possible at the next time point may be controlled, and it may be assured that the constraint satisfaction rate for the state at the next time point is made equal to or greater than the lower limit value η. For example, as depicted in a graph 600, the probability density of the state x may be controlled such that the constraint satisfaction rate during use of the reinforcement learner 101 is set to 99%.

Description will be made of examples of operations performed by the information processing apparatus 100 using the reinforcement learner 101 among the operations of the information processing apparatus 100 under the problem setting and assumptions 2 to 5 described above. According to the problem setting, equation (26) holds.

$$x_{k+1}=f(x_k)+g(x_k)u_k=Ax_k+Bu_k+e(x_k,u_k) \quad (26)$$

In this case, for step 1, the information processing apparatus 100 uses the parameter ω providing the policy and a state basis function φ(.) and calculates, by equation (27), a mean value $\mu_k$ of the control input that is output at the current time point for the state at the current time point, where $\mu_k$ is m-dimensional.

$$\mu_k=\phi(x_k)^T\omega \quad (27)$$

For step 2, the information processing apparatus 100 calculates, by equation (28), a predicted value of the state including an error at the next time point, based on model information indicative of the linear approximation model of the control object 110 and the state at the current time point. The information processing apparatus 100 calculates, by equation (29), a degree of risk of the state at the current time point, based on the predicted value of the state including the error at the next time point. In this equation, $\varepsilon=[\varepsilon_1,\ldots,\varepsilon_n]^t$ holds; ε is n-dimensional, and $\varepsilon_i=\bar{}\{e_i\}$ or $-\bar{}\{e_i\}$ holds. The universal set of c is denoted as E.

$$\bar{x}_{k+1}^\varepsilon=Ax_k+Bu_k+\varepsilon \quad (28)$$

$$r_k^\varepsilon=-(d-h^T\bar{x}_{k+1}^\varepsilon) \quad (29)$$

For step 3, the information processing apparatus 100 goes to a process at step 4 if equation (30) holds for the degree of risk calculated at step 2 or goes to a process at step 5 if equation (30) does not hold.

$$\neg(r_k^\varepsilon<0,\varepsilon\in E) \quad (30)$$

For step 4, the information processing apparatus 100 determines the control input $U_k=0$ and goes to a process at step 7.

For Step 5, the information processing apparatus 100 calculates the variance-covariance matrix by equations (31) and (32), based on the degree of risk calculated at step 2 and the lower limit value η of the constraint satisfaction rate. $I_m$ is an m×m-dimensional unit matrix. $\phi^{-1}(.)$ is an inverse normal cumulative distribution function.

$$\sum_k = \sigma_k^2 I_m \quad (31)$$

$$\sigma_k = \min_\varepsilon \frac{1}{\|h^TB\|_2 \Phi^{-1}(\eta)}|r_k^\varepsilon| \quad (32)$$

For step 6, the information processing apparatus 100 sets $\mu_k$ calculated at step 1 and $\Sigma_k$ calculated at step 5 as the mean value and the variance-covariance matrix, respectively, to generate a Gaussian probability density function. The information processing apparatus 100 uses the Gaussian probability density function to probabilistically determine the control input $u_k$ with equation (33).

$$u_k \sim N(\mu_k, E_k) \quad (33)$$

For step 7, the information processing apparatus 100 applies the control input $u_k$ determined at step 4 or 6 to the control object 110. As a result, the information processing apparatus 100 may automatically adjust the range for determining the control input depending on the degree of risk during use of the reinforcement learner 101. The range for determining the control input is referred to as a search range, for example. Therefore, the information processing apparatus 100 may assure that the probability of the state of the control object 110 satisfying the constraint condition becomes equal to or greater than the preset lower limit value η during use of the reinforcement learner 101.

Although the control object 110 satisfies assumption 4 alone in this description, the present invention is not limited hereto. For example, a controller for satisfying assumption 4 may be designed in advance and combined with the control object 110 so that the control object 110 satisfies assumption 4. This may increase the number of the control objects 110 to which the information processing apparatus 100 may be applied.

Although the true model of the control object 110 is unknown in this description, the present invention is not limited hereto. For example, the true model of the control object 110 may be known. In this case, the information processing apparatus 100 may calculate the predicted value and the degree of risk of the state by using the true model without using the linear approximation model and may improve the accuracy of making the constraint satisfaction rate equal to or greater than the lower limit value η during use of the reinforcement learner 101.

Although an exact upper limit of the error is known in this description, the present invention is not limited hereto. For example, while the exact upper limit of the error is not known, an upper limit larger than the exact upper limit of the error may be known. Even in this case, the information processing apparatus 100 may perform the reinforcement learning such that the constraint satisfaction rate is made equal to or greater than the lower limit value η during use of the reinforcement learner 101.

A specific example of the operation of the information processing apparatus 100 will be described with an actual example of a control problem. The specific example of the operation of the information processing apparatus 100 will be described by using a two-variable function defined by equations (34) and (35) as an example. Equation (34) satisfies f(0)=0.

$$f = \begin{bmatrix} f_1(x) \\ f_2(x) \end{bmatrix} = \begin{bmatrix} 0.3x_1 - 0.4\sin x_2 \\ -0.1x_2 + 0.2(\cos x_1 - 1) \end{bmatrix} \quad (34)$$

$$x = [x_1, x_2]^T \in \mathbb{R}^2 \quad (35)$$

A matrix $\delta f/\delta x(x)$ having $\delta f_i/\delta x_j$ as an ij component is defined by equation (36). Therefore, the Frobenius norm $\|\delta f/\delta x(x)\|_F$ is defined by equation (37).

$$\frac{\partial f}{\partial x}(x) = \begin{bmatrix} 0.3 & -0.4\cos x_2 \\ -0.2\sin x_1 & -0.1 \end{bmatrix} \quad (36)$$

$$\left\|\frac{\partial f}{\partial x}(x)\right\|_F = \frac{1}{10}\sqrt{4\sin^2 x_1 + 16\cos^2 x_2 + 10} \quad (37)$$

Furthermore, from $|\sin(x_1)| \leq 1$ and $|\cos(x_2)| \leq 1$, equation (38) holds for an arbitrary x, and x is two-dimensional. Therefore, a function f is a contraction man in the entire two-dimensional real coordinate space.

$$\left\|\frac{\partial f}{\partial x}(x)\right\|_F = \frac{1}{10}\sqrt{4\sin^2 x_1 + 16\cos^2 x_2 + 10} \leq \frac{1}{10}\sqrt{30} < 1 \quad (38)$$

Assuming that the state at time point k is $x_k = [x_{1k}, x_{2k}]^T$ and the control input at the same time point k is $u_k$, the true model of the control object 110 is defined as a discrete-time nonlinear system by equation (39) using the function f, where $g = [1,1]^T$. The state $x_k$ is two-dimensional. The control input $u_k$ is a real number.

$$x_{k+1} = f(x_k) + gu_k \quad (39)$$

The linear approximation model of the control object 110 is defined by equations (40) and (41), and f and g are unknown. A and B are known.

$$x_{k+1} \simeq Ax_k + Bu_k \quad (40)$$

$$A = \begin{bmatrix} 0.3 & 0 \\ 0 & -0.1 \end{bmatrix}, b = \begin{bmatrix} 1 \\ 1 \end{bmatrix} \quad (41)$$

The upper limit of the error function $e_i$ is defined by equations (42) and (43). It is assumed that $\mathrm{bar}\{e_1\} = 0.4$ and $\mathrm{bar}\{e_2\} = 0.4$ are known. In other words, assumption 3 holds.

$$\sup_{x \in \mathbb{R}^2, u \in \mathbb{R}} |0.4\sin x_2| = 0.4 \quad (42)$$

$$\sup_{x \in \mathbb{R}^2, u \in \mathbb{R}} |0.2(\cos x_1 - 1)| = 0.4 \quad (43)$$

The constraint condition for the state is assumed as $x_1 \leq 10$. In other words, by using $h^T = [1,0]$ and $d = 10$, the set X of the states satisfying the constraint is defined by equation (44).

$$X = \{x \in \mathbb{R}^2 | h^T x \leq d\} \quad (44)$$

Assumption 4 holds due to the fact that the function f is the contraction map in the entire two-dimensional real coordinate space and has a fixed point as the origin, and a shape of X. An initial state is assumed as $x_0 = [5,5]^T$. Because of $h^T B \neq 0$, the coefficient matrix of the linear approximation model and the constraint condition satisfy assumption 5. The immediate cost is defined by equation (45). $Q = 1.0 \times 10^5 I_2$ and $R = 1$ are assumed.

$$c_{k+1} = \quad (45)$$
$$\begin{cases} (f(x_k) + gu_k)^T Q(f(x_k) + gu_k) + Ru_k^2 & \text{if } |x_{1_k}| \leq 10 \\ (T - k - 1)\{(f(x_k) + gu_k)^T Q(f(x_k) + gu_k) + Ru_k^2\} & \text{otherwise} \end{cases}$$

The information processing apparatus 100 performs the continuous reinforcement learning by using the reinforcement learner 101 and the fixed controller 102 in which the control input decision method described above is incorporated in one-step actor-critic. For example, the information processing apparatus 100 uses T=100 steps and learns a policy for determining the control input minimizing the cumulative cost J of the immediate cost. Step corresponds to a unit of processing of determining the control input and observing the immediate cost at each time point indicated by a multiple of a unit time.

Since $\theta$ is defined by equation (46) and $\omega$ is defined by equation (47), an estimated value $\mathrm{bar}\{V(x;\theta)\}$ of a value function and a mean value $\mu(x;\omega)$ of a control input u are defined by equation (48) and equation (49). The weight $\theta$ is $N\theta$-dimensional, and $\omega$ is $N\omega$-dimensional.

$$\theta = [\theta_1, \ldots, \theta_{N_\theta}]^T \in \mathbb{R}^{N_\theta} \quad (46)$$

$$\omega = [\omega_1, \ldots, \omega_{N_\omega}]^T \in \mathbb{R}^{N_\omega} \quad (47)$$

$$\hat{V}(x;\theta) = \sum_{i=1}^{N_\theta} \phi_i(x)\theta_i \quad (48)$$

$$\mu(x;\omega) = \sum_{i=1}^{N_\omega} \phi_i(x)\omega_i \quad (49)$$

Where, $\varphi_i(.)$ converts a two-dimensional array into a one-dimensional array, $\varphi i(.)$ is a Gaussian radial basis function defined by equation (50), $c_i$ and $s_i^2 > 0$ are a center point and a variance, respectively, of each basis function, and $c_i$ is two-dimensional.

$$\phi_i(x) = \exp\left(-\frac{\|x - c_i\|^2}{2s_i^2}\right), i = 1, \ldots, N_\theta \quad (50)$$

The information processing apparatus 100 is assumed to determine the control input of each time point by applying the mean value $\mu(x;\omega)$ calculated by using the state $x_k$ of each time point and the parameter $\omega$ according to equation (50). The information processing apparatus 100 is assumed to update the weight $\theta$ and the parameter $\omega$ by using an immediate cost $c_{k+1}$ at each time point with equations (51) to (53).

$$\delta \leftarrow -c_{k+1} + \gamma\hat{V}(x_{k+1};\theta) - \hat{V}(x_k;\theta) \quad (51)$$

$$\theta \leftarrow \theta + \alpha\delta\frac{\partial \hat{V}}{\partial \theta}(x_k;\theta) \quad (52)$$

$$\omega \leftarrow \omega + \beta\delta\frac{\partial \log \Pi}{\partial \omega}(u_k | x_k;\omega) \quad (53)$$

Where, $\alpha \in [0,1)$ and $\beta \in [0,1)$ are learning rates, and $\Pi(.)$ is the Gaussian probability density function when $\mu_k$ is the mean value and $\Sigma_k$ is the variance-covariance matrix. The information processing apparatus 100 uses, as the fixed controller 102, equation (54) that enables a transition from a state not satisfying the constraint condition to a state $X_{safe}=[5,-5]\in X$ satisfying the constraint condition within two times.

$$\begin{bmatrix} u_k^{back} \\ u_{k+1}^{back} \end{bmatrix} = \tilde{B}^{-1}(x_{safe} - A^2 x_k), \tilde{B} := [Ab, b] \quad (54)$$

The lower limit value ρ of the constraint satisfaction rate during the reinforcement learning is defined by equation (55) and is ρ=0.97. Therefore, the lower limit value η of the constraint satisfaction rate during use of the reinforcement learner 101 is defined by equation (56) and is n=0.985, and the inequality of equation (57) holds.

$$Pr\{h^T x_k \le d\} \ge \rho = 0.97 \quad (55)$$

$$\eta = \rho^{\frac{1}{2}} = 0.985 \quad (56)$$

$$Pr\{h^T x_k \le d\} \ge \eta = 0.985 \quad (57)$$

As a result, when the constraint condition is not satisfied, the information processing apparatus 100 may make a return to the state satisfying the constraint condition by using the fixed controller 102. In consideration of a reduction in the constraint satisfaction rate at the time of return to the state satisfying the constraint condition, the information processing apparatus 100 may make the constraint satisfaction rate equal to or greater than the lower limit value η, which is larger than the preset lower limit value ρ, during use of the reinforcement learner 101. Therefore, the information processing apparatus 100 may assure that the constraint satisfaction rate becomes equal to or greater than the preset lower limit value ρ at all time points during the reinforcement learning. Description will then be made with reference to FIG. 7.

In the example of FIG. 7, η=0.97 is assumed. As depicted in FIG. 7, when the current state is a state 701 in the real coordinate space 500, the information processing apparatus 100 makes a transition to an interior point of the set X such as a state 702 with an probability η=0.985 and makes a transition to an exterior point of the set X such as a state 703 with the probability 1−η=0.015. When the transition is made to an exterior point of the set X such as the state 703 in the real coordinate space 500, the information processing apparatus 100 makes a return to an interior point of the set X such as a state 706 within τ steps. In this way, the information processing apparatus 100 may make the constraint satisfaction rate equal to or greater than the probability η during use of the reinforcement learner 101 in consideration of a reduction in the constraint satisfaction rate during the reinforcement learning due to the transition to the exterior point of the set X such as the state 703.

On the other hand, when the current state is a state 704 in the real coordinate space 500, the information processing apparatus 100 sets the control input to 0, which causes a transition to an interior point of the set X such as a state 705 and therefore, may assure that the constraint condition is always satisfied. From the above, the information processing apparatus 100 may assure that the constraint condition is satisfied with the probability η or more at all time points during the reinforcement learning. An effect obtained by the information processing apparatus 100 in the actual example in operation example 1 will be described with reference to FIG. 9.

Figure 8:
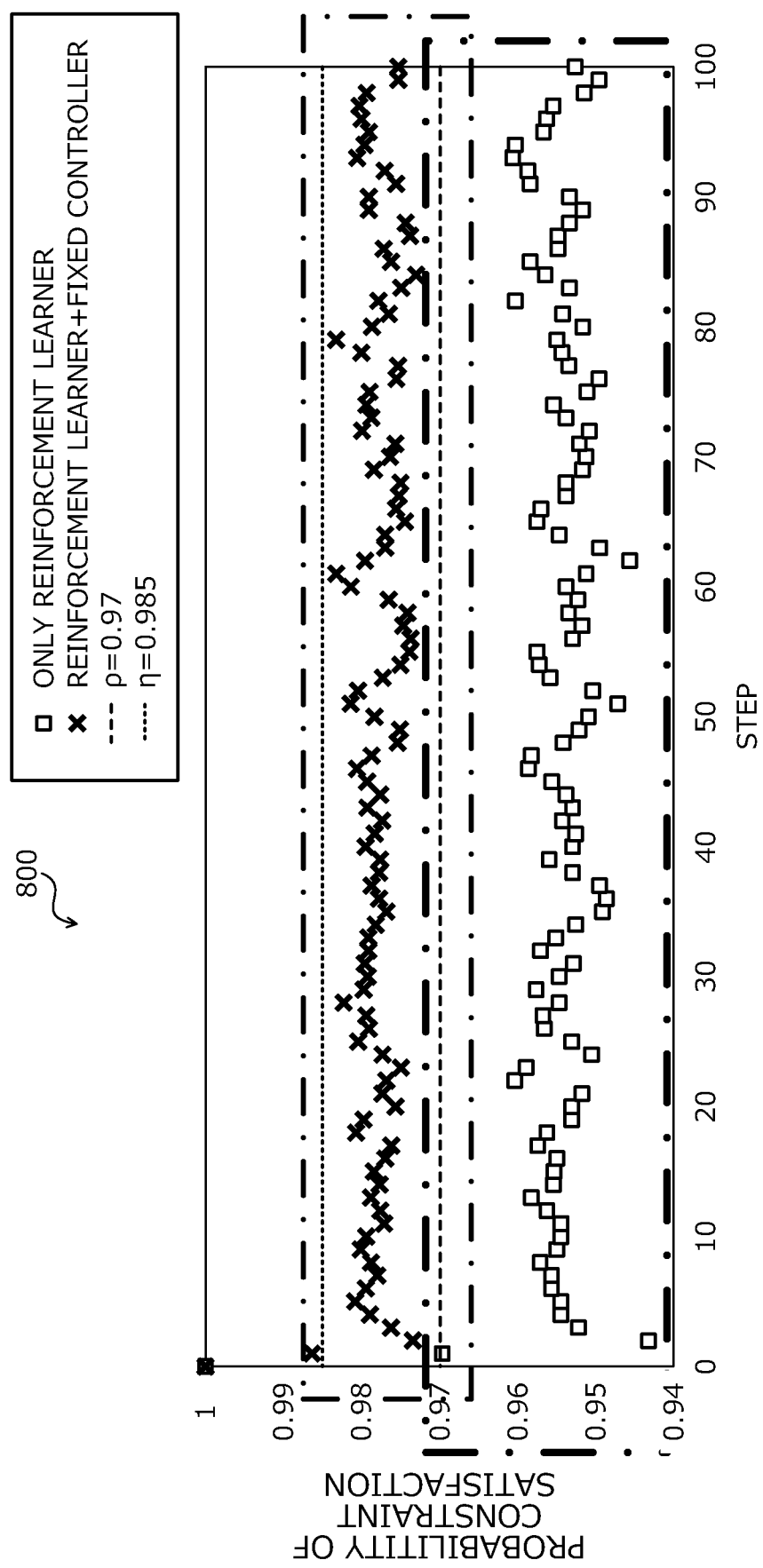
FIG. 8 is an explanatory diagram depicting an effect obtained by the information processing apparatus 100 in operation example 1.

FIG. 8 is an explanatory diagram depicting an effect obtained by the information processing apparatus 100 in operation example 1. In FIG. 8, the reinforcement learning using the information processing apparatus 100 is compared with the reinforcement learning using only the reinforcement learner 101. In the reinforcement learning using only the reinforcement learner 101, the lower limit value η of the constraint satisfaction rate is set to η=0.97 as indicated by equation (58).

$$Pr\{h^T x_k \le d\} \ge \eta = 0.97 \quad (58)$$

A graph 800 of FIG. 8 indicates an average value of the constraint satisfaction rate at the steps at the same time points in multiple reinforcement learnings when the reinforcement learning is performed multiple times. A horizontal axis indicates the steps. A vertical axis indicates the average value of the constraint satisfaction rate. As depicted in the graph 800, the reinforcement learning by the information processing apparatus 100 may assure that the constraint satisfaction rate becomes equal to or greater than the preset lower limit value ρ at all time points during the reinforcement learning. On the other hand, the reinforcement learning using only the reinforcement learner 101 cannot make the constraint satisfaction rate equal to or greater than the preset lower limit value ρ.

In this way, the information processing apparatus 100 may assure that the constraint satisfaction rate becomes equal to or greater than the preset lower limit value ρ and may suppress the reduction in the learning efficiency, during learning of the policy through the reinforcement learning.

Although one constraint condition is set in this description, the present invention is not limited hereto. For example, multiple constraint conditions may be set. When the multiple constraint conditions are independent of each other, the information processing apparatus 100 uses the reinforcement learner 101 assuring that the constraint satisfaction rate for each of the constraint conditions is made equal to or greater than the lower limit value η as in operation example 1. As a result, the information processing apparatus 100 may make the probability of simultaneous satisfaction of the multiple constraint conditions equal to or greater than the lower limit value ρ during the reinforcement learning. In the following description, the probability of simultaneous satisfaction of multiple constraint conditions may be referred to as "simultaneous satisfaction rate".

Figure 9:
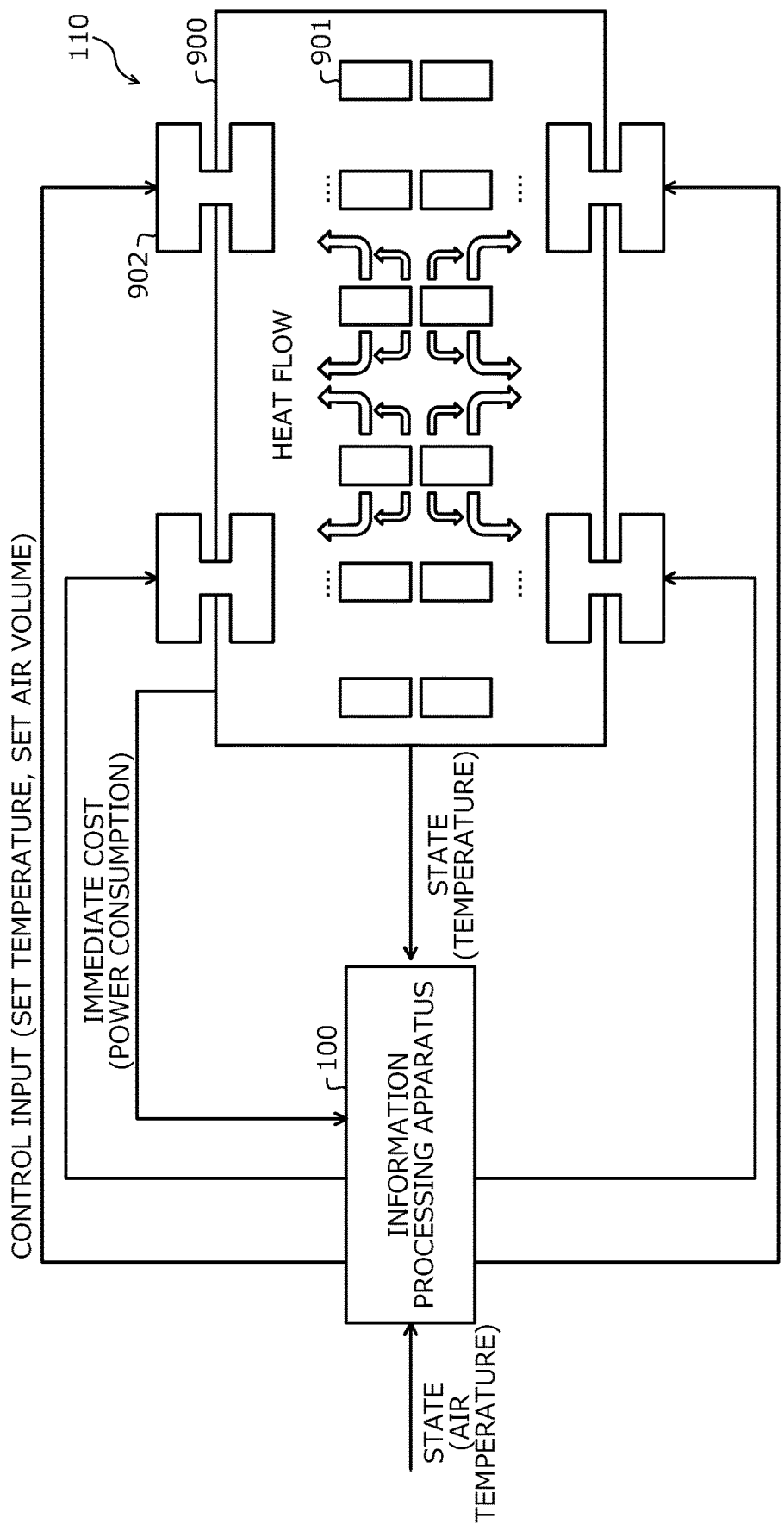
FIG. 9 is an explanatory diagram depicting a specific example of the control object 110.
Figure 10:
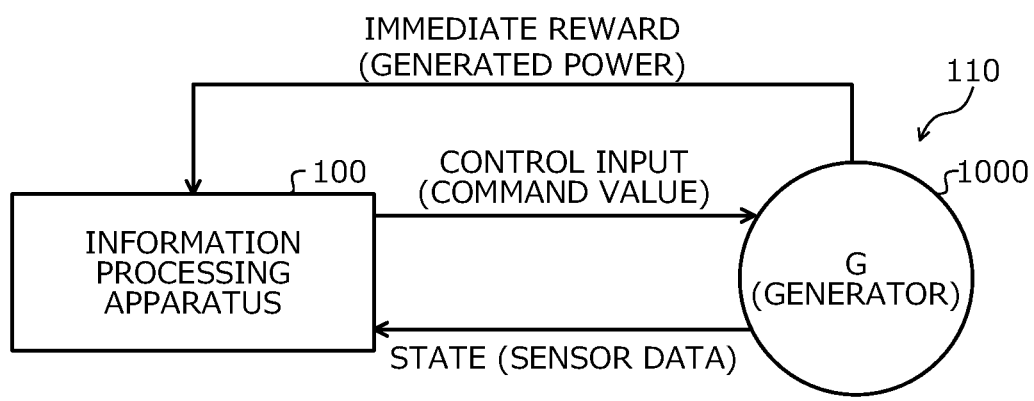
FIG. 10 is an explanatory diagram depicting a specific example of the control object 110.
Figure 11:
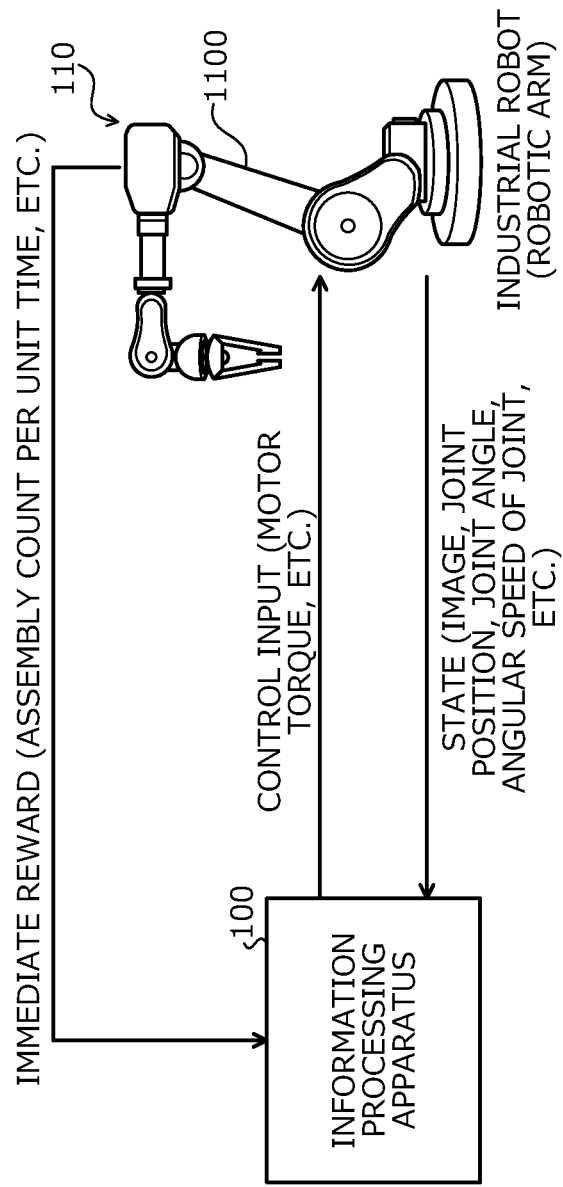
FIG. 11 is an explanatory diagram depicting a specific example of the control object 110.

Description will be made of a specific example of the control object 110 to which the reinforcement learning is applied with reference to FIGS. 9 to 11. FIGS. 9, 10, and 11 are explanatory diagrams depicting a specific example of the control object 110. In the example of FIG. 9, the control object 110 is a server room 900 including a server 901 acting as a heat source and a cooler 902 such as CRAC or a chiller. The control input is a set temperature and a set air volume for the cooler 902. The state is sensor data, etc. from a sensor apparatus disposed in the server room 900 and is temperature, for example. The state may be data related to the control object 110 obtained from other than the control object 110 and may be temperature or weather, for example. The immediate cost is power consumption per unit time of the server room 900, for example. The unit time is 5 minutes, for example. The goal is to minimize the cumulative power consumption of the server room 900. The state value function represents the value of the control input for the cumulative power consumption of the server room 900, for example.

In the example of FIG. 10, the control object 110 is a power generation facility 1000. The power generation facility 1000 is a wind power generation facility, for example. The control input is a command value for the power generation facility 1000. The command value is a generator torque of a generator in the power generation facility 1000, for example. The state is sensor data from a sensor apparatus disposed in the power generation facility 1000 and is a power generation amount of the power generation facility 1000 or a rotation amount or a rotation speed of a turbine of the power generation facility 1000, for example. The state may be a wind direction or a wind speed with respect to the power generation facility 1000. The immediate reward is an amount of power generation per unit time of the power generation facility 1000, for example. The unit time is 5 minutes, for example. The goal is to maximize a cumulative power generation amount of the power generation facility 1000, for example. The state value function represents a value of the control input for the cumulative power generation amount of the power generation facility 1000, for example. In this case, for example, when making the rotation speed equal to or less than an upper limit is defined as the constraint condition, the fixed controller 102 may be a controller making the generator torque equal to or greater than a certain level or applying a brake, etc. to reduce the rotation speed.

In the example of FIG. 11, the control object 110 is an industrial robot 1100. The industrial robot 1100 is a robotic arm, for example. The control input is a command value for the industrial robot 1100. The command value is a motor torque of the industrial robot 1100, for example. The state is sensor data from a sensor apparatus disposed in the industrial robot 1100 and is, for example, an image captured by the industrial robot 1100, a joint position, a joint angle, or a joint angular speed of the industrial robot 1100. The immediate reward is the number of assemblies of the industrial robot 1100 per unit time, for example. The goal is to maximize the productivity of the industrial robot 1100. The state value function represents the value of the control input for the cumulative number of assemblies of the industrial robot 1100, for example.

The control object 110 may be a simulator of the specific example described above. The control object 110 may be a power generation facility other than for wind power generation. The control object 110 may be a chemical plant or an autonomous mobile robot, for example. The control object 110 may be a vehicle such as an automobile. The control object 110 may be a flying object such as a drone or a helicopter, for example. The control object 110 may be a game, for example.

An example of an overall process procedure in operation example 1, executed by the information processing apparatus 100 will be described with reference to FIG. 12. The overall process is implemented by the CPU 301, the storage areas of the memory 302, the recording medium 305, etc., and the network I/F 303 depicted in FIG. 3, for example.

Figure 12:
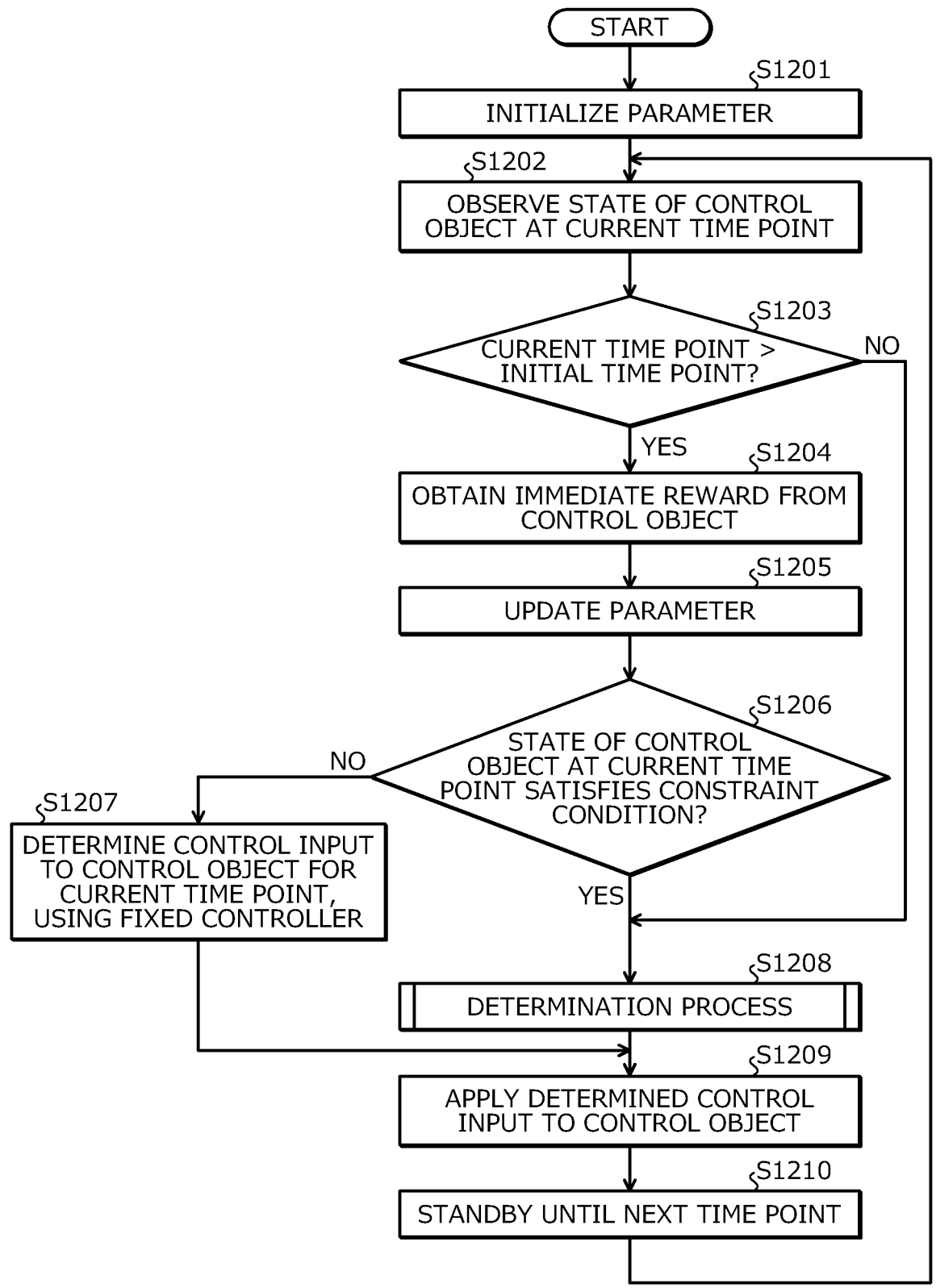
FIG. 12 is a flowchart depicting an example of an overall process procedure in operation example 1.

FIG. 12 is a flowchart depicting an example of the overall process procedure in operation example 1. In FIG. 12, the information processing apparatus 100 initializes the parameter providing the policy (step S1201).

The information processing apparatus 100 then observes the state of the control object 110 at the current time point (step S1202). The information processing apparatus 100 determines whether the current time point > the initial time point is satisfied (step S1203). If the current time point > the initial time point is not satisfied (step S1203: NO), the information processing apparatus 100 goes to a process at step S1208. On the other hand, if the current time point > the initial time point is satisfied (step S1203: YES), the information processing apparatus 100 goes to a process at step S1204.

At step S1204, the information processing apparatus 100 obtains the immediate reward from the control object 110 (step S1204). Subsequently, the information processing apparatus 100 updates the parameter providing the policy (step S1205). The information processing apparatus 100 then determines whether the state of the control object 110 at the current time point satisfies the constraint condition (step S1206). If the constraint condition is satisfied (step S1206: YES), the information processing apparatus 100 goes to a process at step S1208. On the other hand, if the constraint condition is not satisfied (step S1206: NO), the information processing apparatus 100 goes to a process at step S1207.

At step S1207, the information processing apparatus 100 determines the control input to the control object 110 at the current time point, using the fixed controller (step S1207). The information processing apparatus 100 goes to a process at step S1209.

At step S1208, the information processing apparatus 100 executes a determination process described later with reference FIG. 13 to determine the control input to the control object 110 at the current time point (step S1208). The information processing apparatus 100 goes to a process at step S1209.

At step S1209, the information processing apparatus 100 applies the determined control input to the control object 110 (step S1209). Subsequently, the information processing apparatus 100 stands by until the next time point (step S1210). The information processing apparatus 100 returns to the process at step S1202.

An example of a determination process procedure in operation example 1, executed by the information processing apparatus 100 will be described with reference to FIG. 13. The determination process is implemented by the CPU 301, the storage areas of the memory 302, the recording medium 305, etc., and the network I/F 303 depicted in FIG. 3, for example.

Figure 13:
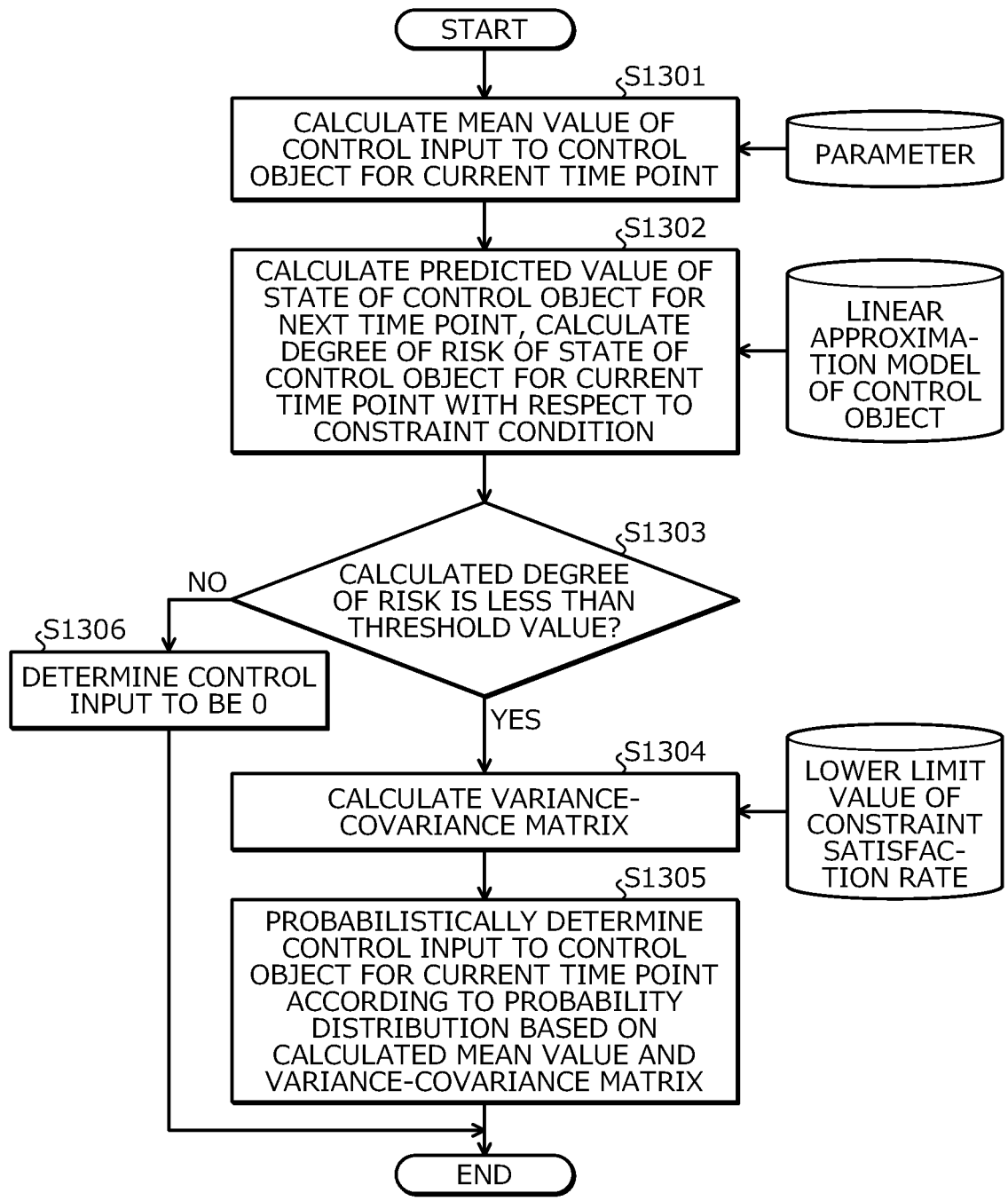
FIG. 13 is a flowchart depicting an example of a determination process procedure in operation example 1.

FIG. 13 is a flowchart depicting an example of the determination process procedure in operation example 1. In FIG. 13, the information processing apparatus 100 refers to the parameter providing the policy and calculates a mean value of the control input to the control object 110 for the current time point (step S1301).

Subsequently, the information processing apparatus 100 refers to the linear approximation model of the control object 110 and calculates a predicted value of the state of the control object 110 for the next time point and further calculates the degree of risk of the state of the control object 110 for the current time point with respect to the constraint condition (step S1302).

The information processing apparatus 100 then determines whether the calculated degree of risk is less than a threshold value (step S1303). If the degree is equal to or greater than the threshold value (step S1303: NO), the information processing apparatus 100 goes to a process at step S1306. On the other hand, if the degree of risk is less than the threshold value (step S1303: YES), the information processing apparatus 100 goes to a process at step S1304.

At step S1304, the information processing apparatus 100 refers to the lower limit value η of the constraint satisfaction rate set as the parameter of the reinforcement learner 101 and calculates the variance-covariance matrix (step S1304). Subsequently, the information processing apparatus 100 probabilistically determines the control input to the control object 110 for the current time point according to the probability distribution based on the calculated mean value and variance-covariance matrix (step S1305). The information processing apparatus 100 terminates the determination process.

At step S1306, the information processing apparatus 100 determines the control input to be 0 (step S1306). The information processing apparatus 100 terminates the determination process.

Figure 14:
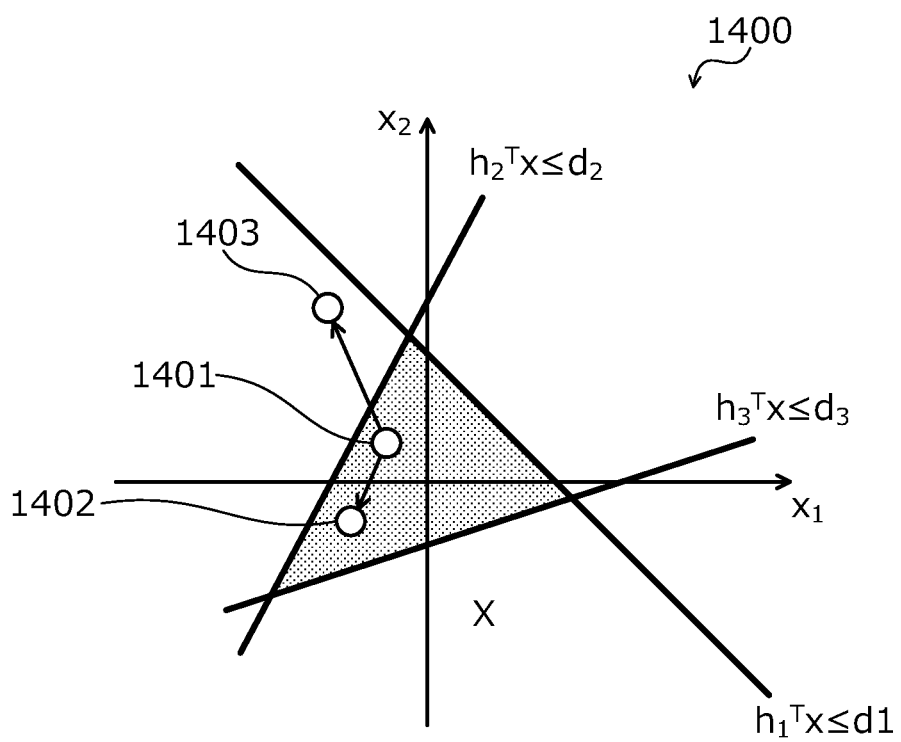
FIG. 14 is an explanatory diagram depicting operation example 2 of the information processing apparatus 100.
Figure 15:
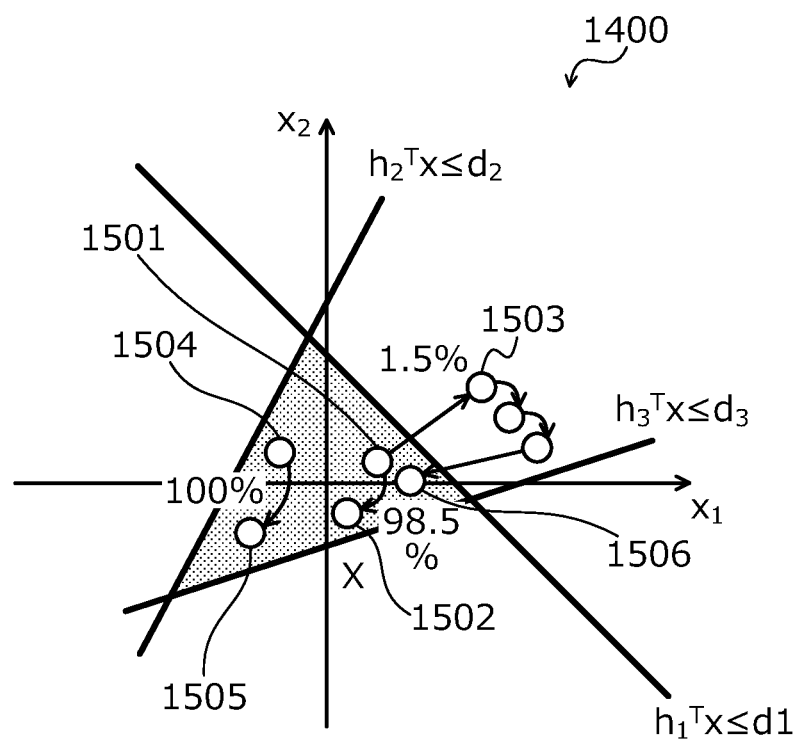
FIG. 15 is an explanatory diagram depicting operation example 2 of the information processing apparatus 100.

Operation example 2 of the information processing apparatus 100 will be described with reference to FIGS. 14 and 15. FIGS. 14 and 15 are explanatory diagrams depicting operation example 2 of the information processing apparatus 100. Operation example 1 described above corresponds to the case in which one constraint condition is set. On the other hand, operation example 2 corresponds to the case in which multiple constraint conditions are set. In the following description, first, a flow of operations of the information processing apparatus 100 will be described. Among the operations of the information processing apparatus 100, exemplary operations performed by using the reinforcement learner 101 will then be described with mathematical expressions.

In operation example 1, a control goal is to learn the policy for determining a control input minimizing the cumulative cost. A control purpose is to assure that the probability of satisfaction of a constraint condition $\{f_i\}_i$ related to the state is made equal to or greater than a lower limit value $\rho \in (0,1)$ at all time points $k \geq 1$ during the reinforcement learning for learning the policy and is defined by equations (1) and (2). The constraint condition $\{f_i\}_i$ needs not be linear and exists in plural. Pr(.) denotes the probability that the condition in (.) is satisfied.

It is assumed that in the case of a state $X_k = x \in X$, a constant $\tau$ independent of the time point k or the state x exists and that a calculation method of a control input sequence for moving the state into X within $\tau$ steps is known. In the following description, "assumption 1" may denote an assumption that the calculation method of the control input sequence is known. In other words, it is assumed that $u_k^{back}(x), u_{k+1}^{back}(x), \ldots, u_{k+j}^{back}(x)$ satisfying $u_{k+j}^{back}(x) \in X$ ($j \leq \tau$) exist. This leads to the assumption that the fixed controller 102 exists.

Regarding the reinforcement learning and the control object 110, the following four characteristics are assumed. A first characteristic is a property that the reinforcement learning may use a policy of probabilistically determining the control input and may change the variance-covariance matrix of a probability density function used for determining the control input at a timing. A second characteristic is a property that since the control object 110 is linear with respect to the control input and the constraint condition is linear with respect to the state, the variance of the control input that is possible at the first time point is stored for the state of the control object 110 possible at the second time point subsequent to the first time point. A third characteristic is a property that when the control input is 0, no transition is made from a state satisfying the constraint condition to a state not satisfying the constraint condition. A fourth characteristic is a property that a probability of at least one of multiple events occurring is equal to or less than a sum of the probabilities of each of the multiple events occurring. This leads to the assumption that the reinforcement learner 101 exists.

To make the simultaneous satisfaction rate equal to or greater than η, the information processing apparatus 100 sets a lower limit value η' of the constraint satisfaction rate for each of the constraint conditions and uses the reinforcement learner 101. The lower limit value η' of the constraint satisfaction rate for each of the constraint conditions is calculated by equation (59), where $n_c$ is the number of the constraint conditions.

$$\eta' = 1 - \frac{1-\eta}{n_c} \tag{59}$$

The information processing apparatus 100 performs the continuous reinforcement learning by using the reinforcement learner 101 when the current state satisfies the constraint condition and by using the fixed controller 102 when the current state does not satisfy the constraint condition. As described above, the reinforcement learner 101 assures that a simultaneous satisfaction rate is made equal to or greater than the lower limit value η, and the fixed controller 102 assures that the state is moved into X within τ steps. In this case, a combination of the reinforcement learner 101 and the fixed controller 102 may assure that the constraint satisfaction rate is made equal to or greater than a lower limit value ητ.

Therefore, when the constraint condition is satisfied, the information processing apparatus 100 sets the lower limit value η related to the reinforcement learner 101 to a τ-th root of a target probability ρ and uses the reinforcement learner 101 to determine the control input. When the constraint condition is not satisfied, the information processing apparatus 100 uses the fixed controller to determine the control input. As a result, the information processing apparatus 100 may assure that the constraint satisfaction rate is equal to or greater than the target probability ρ during the reinforcement learning.

In operation example 2, the control object 110, the immediate cost, the constraint condition, and the control purpose are defined by equations (6) to (12), equation (17), equation (18), and equations (60) to (64), and problem setting is performed. Additionally, the characteristics related to the reinforcement learning and the control object 110 assumed in operation example 2 are defined by equations (20) to (24), equation (65), and equation (66).

In the following description, equations (6) to (12), equation (17), and equation (18) are the same as operation example 1 and therefore, will not be described. Equations (20) to (24) are the same as operation example 1 and therefore, will not be described.

$$Hx \leq d \tag{60}$$

$$H = [h_1, \ldots, h_{n_c}]^T \in \mathbb{R}^{n_c \times n} \tag{61}$$

$$d = [d_1, \ldots, d_{n_c}]^T \in \mathbb{R}^{n_c} \tag{62}$$

Equation (60) defines the multiple constraint conditions and x is the state. A matrix H is set by the user. An array d is set by the user. The constraint conditions are known and are linear with respect to the state x. In operation example 2, the multiple constraint conditions exist. Equation (61)

indicates that the matrix H is n-dimensional. Equation (62) indicates that the array d is a real number.

$$X = \{x \in \mathbb{R}^2 | Hx \leq d\} \quad (63)$$

Equation (63) represents a set X of states x satisfying the multiple constraint conditions. In the following description, an interior point of X may be denoted by $X^{int}$, and $x^* \in X^{int}$ satisfying $f(x^*)=x^*$ and $x^* \in X^{int}$ satisfying $c(x^*,0)=0$ exist.

$$Pr\{Hx_k \leq d\} \geq \eta (\Leftrightarrow Pr\{h_j^T x_k \leq d_j, \forall j=1,2,\ldots,n_c\} \geq \eta) \quad (64)$$

Equation (64) defines the control purpose of the reinforcement learning as assuring that the simultaneous satisfaction rate at all time points is made equal to or greater than the lower limit value $\eta \in (0.5, 1)$ with respect to the multiple constraint conditions. Pr(.) indicates a probability of satisfaction of the conditions in (.).

It is assumed that if $x \in X$, then $f(x) \in X$. In the following description, "assumption 4" may denote an assumption that if $x \in X$, then $f(x) \in X$. As depicted in FIG. 14, assumption 4 indicates that if the state x simultaneously satisfies the multiple constraint conditions and the control input is 0 at a time point, the state x after a transition also satisfies the constraint condition at the next time point. For example, when the current state is a state 1401 in a real coordinate space 1400 and the control input is set to 0, a transition to an interior point of the set X such as a state 1402 may occur; however, a transition to an exterior point of the set X such as a state 1403 does not occur. Therefore, when the control input is 0 during use of the reinforcement learner 101, it may be assured that the simultaneous satisfaction rate for the state after the transition is increased to be equal to or greater than the lower limit value $\eta$.

$$h_j^T B \neq 0 \quad (65)$$

$$\forall j = 1, \ldots, n_c \quad (66)$$

It is assumed that equation (65) and equation (66) hold with respect to the coefficient matrix of the linear approximation model of the control object 110 and the constraint condition. In the following description, "assumption 5" may denote an assumption that equation (65) and equation (66) hold with respect to the coefficient matrix of the linear approximation model of the control object 110 and the constraint condition.

In the problem setting described above, the control object 110 is linear with respect to the control input, and the constraint condition is linear with respect to the state. Therefore, a degree of variance of the control input at a time point is correlated with a degree of variance of the state of the control object 110 at the next time point. Therefore, by adjusting the degree of variance of the control input for a time point, the degree of variance of the state at the next time point may be controlled, and it may be assured that the constraint satisfaction rate for the state at the next time point is increased to be equal to or greater than the lower limit value.

Description will be made of an example of operations of the information processing apparatus 100 under assumptions 2 to 5 describe above. According to the problem setting, equation (26) holds. In this case, for step 1, the information processing apparatus 100 uses the parameter w providing the policy and a state basis function $\varphi(.)$ and calculates, by equation (27), a mean value $\mu_k$ of the control input that is output at the current time point for the state at the current time point, where $\mu_k$ is m-dimensional.

For step 2, the information processing apparatus 100 calculates, by equation (28), a predicted value of the state including an error at the next time point, based on model information indicative of the linear approximation model of the control object 110 and the state at the current time point. The information processing apparatus 100 calculates, by equation (67), a degree of risk of the state at the current time point for each constraint condition, based on the predicted value of the state including the error at the next time point. In this equation, $\varepsilon = [\varepsilon_1, \ldots, \varepsilon_n]^t$ holds; $\varepsilon$ is n-dimensional, and $\varepsilon_i = \text{bar}\{e_i\}$ or $-\text{bar}\{e_i\}$ holds. The universal set of $\varepsilon$ is denoted as E.

$$r_{jk}^\varepsilon = -(d_j - h_j^T x_{k+1}^\varepsilon) \quad (67)$$

For step 3, the information processing apparatus 100 goes to a process at step 4 if equation (68) holds for the degree of risk calculated at step 2 or goes to a process at step 5 if equation (68) does not hold.

$$\neg(r_{jk}^\varepsilon < 0, \forall j=1,2,\ldots,n_c, \forall \varepsilon \in E) \quad (68)$$

For step 4, the information processing apparatus 100 determines the control input $U_k=0$ and goes to a process at step 7. For Step 5, the information processing apparatus 100 calculates the variance-covariance matrix by equations (31), (56), and (69), based on the degree of risk calculated at step 2 and the lower limit value $\eta'$ of the constraint satisfaction rate of the constraint conditions. $I_m$ is an m×m-dimensional unit matrix. $\phi^{-1}(.)$ is an inverse normal cumulative distribution function.

$$\sigma_k = \min_{j,\varepsilon} \frac{1}{\|h_j^T B\|_2 \Phi^{-1}(\eta')} |r_{jk}^\varepsilon| \quad (69)$$

For step 6, the information processing apparatus 100 sets $\mu_k$ calculated at step 1 and $\Sigma_k$ calculated at step 5 as the mean value and the variance-covariance matrix, respectively, to generate a Gaussian probability density function. The information processing apparatus 100 uses the Gaussian probability density function to probabilistically determine the control input $u_k$ with equation (33).

For step 7, the information processing apparatus 100 applies the control input $u_k$ determined at step 4 or 6 to the control object 110. As a result, the information processing apparatus 100 may automatically adjust the range for determining the control input according to the degree of risk. Therefore, the information processing apparatus 100 may assure that the simultaneous satisfaction rate is increased to be equal to or greater than the preset lower limit value $\eta$ during use of the reinforcement learner 101.

As a result, the information processing apparatus 100 may use the reinforcement learner 101 and the fixed controller 102 to assure that the simultaneous satisfaction rate is made equal to or greater than the probability $\rho$ during the reinforcement learning. Referring to FIG. 15, description will then be made of the information processing apparatus 100 using the reinforcement learner 101 and the fixed controller 102 to assure that the simultaneous satisfaction rate is made equal to or greater than the probability $\rho$ during the reinforcement learning.

In the example of FIG. 15, $\eta=0.97$ is assumed. As depicted in FIG. 15, when the current state is a state 1501 in the real coordinate space 1400, the information processing apparatus 100 makes a transition to an interior point of the set X such as a state 1502 with the probability $\eta=0.985$. When the current state is the state 1501 in the real coordinate space 1400, the information processing apparatus 100 makes a transition to an exterior point of the set X such as a state 1503 with the probability $1-\eta=0.015$. When the transition is made to an exterior point of the set X such as the state 1503 in the real coordinate space 1400, the information processing apparatus 100 makes a return to an interior point of the set X such as a state 1506 within τ steps. In this way, the information processing apparatus 100 may make the simultaneous satisfaction rate equal to or greater than the probability η during use of the reinforcement learner 101 in consideration of a reduction in the simultaneous satisfaction rate during the reinforcement learning due to the transition to an exterior point of the set X such as the state 1503.

On the other hand, when the current state is a state 1504 in the real coordinate space 1400, the information processing apparatus 100 sets the control input to 0, which causes a transition to an interior point of the set X such as a state 1505 and therefore, may assure that the constraint conditions are always satisfied. From the above, the information processing apparatus 100 may assure that the simultaneous satisfaction rate is made equal to or greater than the probability ρ at all time points during the reinforcement learning.

An example of an overall process procedure in operation example 2, executed by the information processing apparatus 100 will be described with reference to FIG. 16. The overall process is implemented by the CPU 301, the storage areas of the memory 302, the recording medium 305, etc., and the network I/F 303 depicted in FIG. 3, for example.

Figure 16:
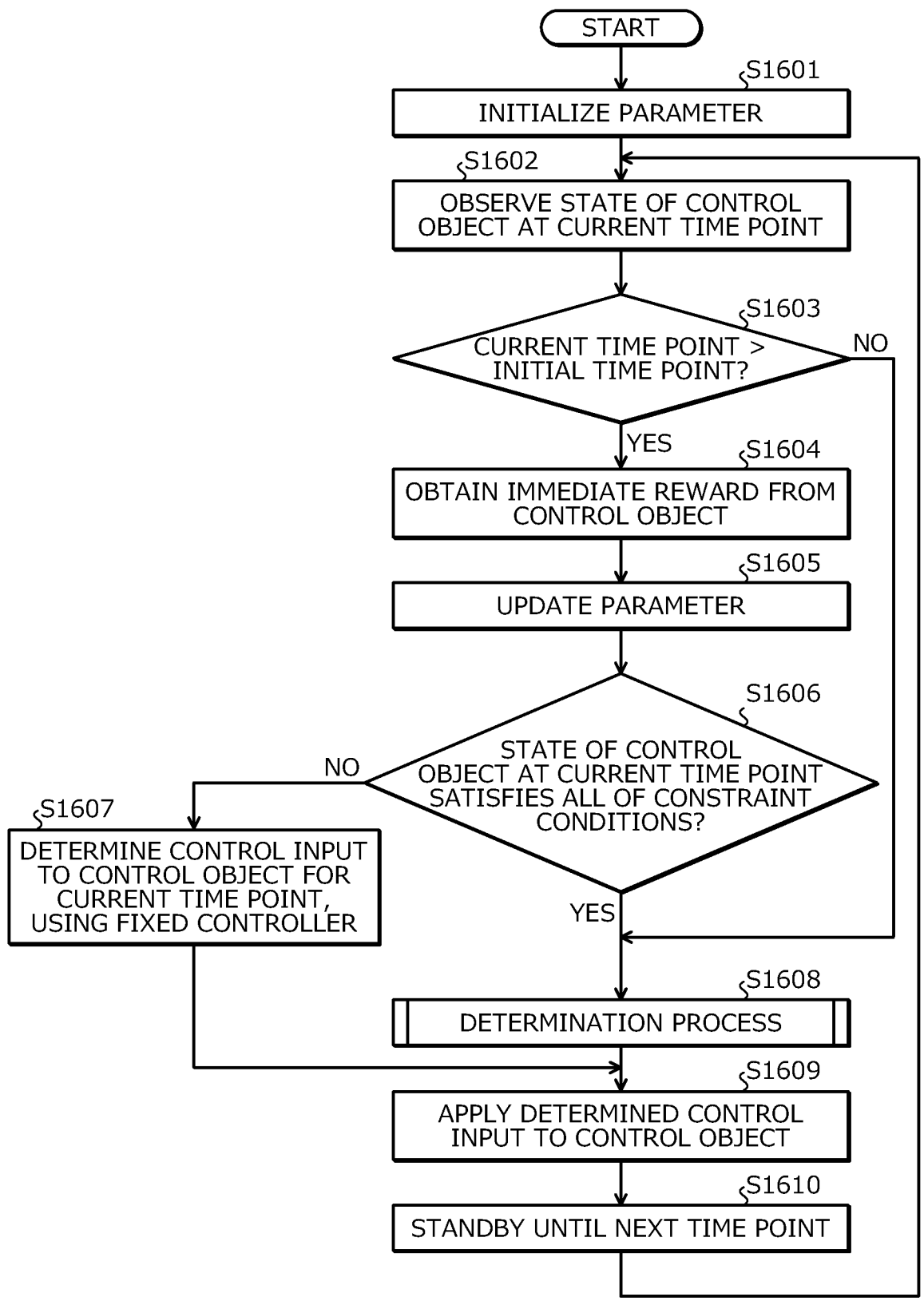
FIG. 16 is a flowchart depicting an example of the overall process procedure in operation example 2.

FIG. 16 is a flowchart depicting an example of the overall process procedure in operation example 2. In FIG. 16, the information processing apparatus 100 initializes the parameter providing the policy (step S1601). The information processing apparatus 100 then observes the state of the control object 110 at the current time point (step S1602).

The information processing apparatus 100 determines whether the current time point > the initial time point is satisfied (step S1603). If the current time point > the initial time point is not satisfied (step S1603: NO), the information processing apparatus 100 goes to a process at step S1608. On the other hand, if the current time point > the initial time point is satisfied (step S1603: YES), the information processing apparatus 100 goes to a process at step S1604.

At step S1604, the information processing apparatus 100 obtains the immediate reward from the control object 110 (step S1604). Subsequently, the information processing apparatus 100 updates the parameter providing the policy (step S1605). The information processing apparatus 100 then determines whether the state of the control object 110 at the current time point satisfies all of the constraint conditions (step S1606).

If any of the constraint conditions is not satisfied (step S1606: NO), the information processing apparatus 100 goes to a process at step S1607. On the other hand, if all the constraint conditions are satisfied (step S1606: YES), the information processing apparatus 100 goes to a process at step S1608.

At step S1607, the information processing apparatus 100 determines the control input to the control object 110 at the current time point, using the fixed controller (step S1607). The information processing apparatus 100 goes to a process at step S1609.

At step S1608, the information processing apparatus 100 executes a determination process described later with reference FIG. 17 to determine the control input to the control object 110 at the current time point (step S1608). The information processing apparatus 100 goes to a process at step S1609.

At step S1609, the information processing apparatus 100 applies the determined control input to the control object 110 (step S1609). Subsequently, the information processing apparatus 100 stands by until the next time point (step S1610). The information processing apparatus 100 returns to the process at step S1602.

An example of a determination process procedure in operation example 2, executed by the information processing apparatus 100 will be described with reference to FIG. 17. The determination process is implemented by the CPU 301, the storage areas of the memory 302, the recording medium 305, etc., and the network I/F 303 depicted in FIG. 3, for example.

FIG. 17 is a flowchart depicting an example of the determination process procedure in operation example 2. In FIG. 17, the information processing apparatus 100 refers to the parameter providing the policy and calculates a mean value of the control input to the control object 110 for the current time point (step S1701).

Subsequently, the information processing apparatus 100 refers to the linear approximation model of the control object 110 and calculates a predicted value of the state of the control object 110 for the next time point and further calculates the degree of risk of the state of the control object 110 for the current time point with respect to each of the constraint conditions (step S1702).

The information processing apparatus 100 then determines whether all of the calculated degrees of risk are less than a threshold value (step S1703). If any of the degrees of risk is equal to or greater than the threshold value (step S1703: NO), the information processing apparatus 100 goes to a process at step S1706. On the other hand, if all of the degrees of risk are less than the threshold value (step S1703: YES), the information processing apparatus 100 goes to a process at step S1704.

At step S1704, the information processing apparatus 100 refers to the lower limit value η of the simultaneous satisfaction rate set as the parameter of the reinforcement learner 101 and calculates standard deviation for each of the constraint conditions based on the degree of risk of each of the constraint conditions (step S1704). The information processing apparatus 100 then calculates the variance-covariance matrix based on a minimum value of the calculated standard deviation (step S1705).

Subsequently, the information processing apparatus 100 probabilistically determines the control input to the control object 110 for the current time point according to the probability distribution based on the calculated mean value and variance-covariance matrix (step S1706). The information processing apparatus 100 terminates the determination process.

At step S1707, the information processing apparatus 100 determines the control input to be 0 (step S1707). The information processing apparatus 100 terminates the determination process.

As described above, according to the information processing apparatus 100, the parameter of the reinforcement learner 101 may be determined based on the target probability and the specific time related to the fixed controller 102. According to the information processing apparatus 100, the control input to the control object 110 may be determined with either the reinforcement learner 101 or the fixed controller 102 based on whether the state of the control object 110 at a time point satisfies the constraint condition. As a result, the information processing apparatus 100 may selectively use the reinforcement learner 101 and the fixed controller 102 to determine the control input to the control object 110 and may increase the probability of satisfaction of the constraint condition in the entire reinforcement learning.

According to the information processing apparatus 100, the parameter of the reinforcement learner may be determined such that the specific probability is set to a probability calculated based on the specific time and the target probability and higher than the target probability. As a result, the information processing apparatus 100 may easily assure that the probability of satisfaction of the constraint condition is made equal to or greater than a certain level.

According to the information processing apparatus 100, the control object 110 may be a wind power generation facility, and the reinforcement learning may be performed for learning the policy for controlling the control object 110. As a result, the information processing apparatus 100 may easily assure that the probability of satisfaction of the constraint condition is made equal to or greater than a certain level during learning of the policy for controlling the wind power generation facility through the reinforcement learning.

According to the information processing apparatus 100, the specific time may be defined by the number of steps of determining the control input, and the specific probability may be determined as a power root of the number of steps corresponding to the target probability. As a result, the information processing apparatus 100 may set the specific probability so as to assure that the probability of satisfaction of the constraint condition is made equal to or greater than a certain level.

The reinforcement learning method described in the present embodiment may be implemented by executing a prepared program on a computer such as a personal computer and a workstation. The reinforcement learning program described in the embodiments is stored on a non-transitory, computer-readable recording medium such as a hard disk, a flexible disk, a CD-ROM, an MO, and a DVD, read out from the computer-readable medium, and executed by the computer. The reinforcement learning program described in the embodiments may be distributed through a network such as the Internet.

According to one aspect of the present embodiment, a probability that a state of a control object at the next time point will satisfy a constraint condition may be assured to be made equal to or greater than a certain level regardless of the current state of the control object. According to a further aspect, the probability that the constraint condition will be satisfied may be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented reinforcement learning method comprising:
    determining, based on a target probability of satisfaction of a constraint condition related to a state of a control object and a specific time within which a controller causes the state of the control object not satisfying the constraint condition to be the state of the control object satisfying the constraint condition, a parameter of a reinforcement learner that causes, in a specific probability, the state of the control object to satisfy the constraint condition at a first timing following a second timing at which the state of control object satisfies the constraint condition, wherein the specific probability is set to a probability that is higher than the target probability and calculated based on the specific time and the target probability; and
    determining a control input to the control object by either the reinforcement learner or the controller, based on whether the state of the control object satisfies the constraint condition at a specific timing, wherein
        the specific time is defined by the number of steps of determining the control input, and
        the determining of the parameter includes determining the specific probability as a power root of the number of steps corresponding to the target probability.

2. The reinforcement learning method according to claim 1, wherein the reinforcement learner is configured to automatically adjust a search range of the control input so that the constraint condition is satisfied with the specific probability.

3. The reinforcement learning method according to claim 1, wherein the control object is a wind power generation facility, and
    the reinforcement learner uses a generator torque of the wind power generation facility as the control input, at least one of a power generation amount of the power generation facility, a rotation amount of a turbine of the power generation facility, a rotation speed of the turbine of the power generation facility, a wind direction for the power generation facility, and a wind speed for the power generation facility as the state, and the power generation amount of the power generation facility as a reward so as to perform reinforcement learning for learning a policy for controlling the control object.

4. The reinforcement learning method according to claim 1, wherein the determining of the parameter includes determining the specific probability as a square root of the target probability.

5. A computer-readable medium storing therein a reinforcement learning program executable by one or more computing devices, the reinforcement learning program comprising:
    one or more instructions for determining, based on a target probability of satisfaction of a constraint condition related to a state of a control object and a specific time within which a controller causes the state of the control object not satisfying the constraint condition to be the state of the control object satisfying the constraint condition, a parameter of a reinforcement learner that causes, in a specific probability, the state of the control object to satisfy the constraint condition at a first timing following a second timing at which the state of control object satisfies the constraint condition, wherein the specific probability is set to a probability that is higher than the target probability and calculated based on the specific time and the target probability; and
    one or more instructions for determining a control input to the control object by either the reinforcement learner or the controller, based on whether the state of the control object satisfies the constraint condition at a specific timing, wherein
        the specific time is defined by the number of steps of determining the control input, and the determining of the parameter includes determining the specific probability as a power root of the number of steps corresponding to the target probability.

6. The computer-readable medium according to claim 5, wherein the reinforcement learner is configured to automatically adjust a search range of the control input so that the constraint condition is satisfied with the specific probability.

7. The computer-readable medium according to claim 5, wherein the control object is a wind power generation facility, and the reinforcement learner uses a generator torque of the wind power generation facility as the control input, at least one of a power generation amount of the power generation facility, a rotation amount of a turbine of the power generation facility, a rotation speed of the turbine of the power generation facility, a wind direction for the power generation facility, and a wind speed for the power generation facility as the state, and the power generation amount of the power generation facility as a reward so as to perform reinforcement learning for learning a policy for controlling the control object.

8. The computer-readable medium according to claim 5, wherein the determining of the parameter includes determining the specific probability as a square root of the target probability.

9. A reinforcement learning system comprising:

one or more memories; and one or more processors coupled to the one or more memories and the one or more processors configured to:

determine, based on a target probability of satisfaction of a constraint condition related to a state of a control object and a specific time within which a controller causes the state of the control object not satisfying the constraint condition to be the state of the control object satisfying the constraint condition, a parameter of a reinforcement learner that causes, in a specific probability, the state of the control object to satisfy the constraint condition at a first timing following a second timing at which the state of control object satisfies the constraint condition, and cause any one of the reinforcement learner and the controller to determine a control input to the control object, based on whether the state of the control object at a specific timing satisfies the constraint condition.

\* \* \* \* \*